(12) United States Patent
Ichiki

(10) Patent No.: US 8,817,505 B2
(45) Date of Patent: Aug. 26, 2014

(54) THREE-PHASE RECTIFIER WITH BIDIRECTIONAL SWITCHES

(75) Inventor: Satoshi Ichiki, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 114 days.

(21) Appl. No.: 13/380,363

(22) PCT Filed: Jun. 28, 2010

(86) PCT No.: PCT/JP2010/060976
§ 371 (c)(1),
(2), (4) Date: Dec. 22, 2011

(87) PCT Pub. No.: WO2010/150909
PCT Pub. Date: Dec. 29, 2010

(65) Prior Publication Data
US 2012/0106213 A1    May 3, 2012

(30) Foreign Application Priority Data

Jun. 26, 2009 (JP) ................................. 2009-152770
May 12, 2010 (JP) ................................. 2010-110435

(51) Int. Cl.
H02M 7/04  (2006.01)

(52) U.S. Cl.
USPC ........................................................ 363/84

(58) Field of Classification Search
CPC .. H02M 7/797; H02M 7/2173; H02M 7/2176
USPC .............................................. 363/74, 78, 84
See application file for complete search history.

(56) References Cited

U.S. PATENT DOCUMENTS

| | | | | |
|---|---|---|---|---|
| 7,433,212 B2 * | 10/2008 | Igarashi et al. | ................ | 363/71 |
| 7,701,740 B2 * | 4/2010 | Yamanaka | ................ | 363/149 |
| 8,223,517 B2 * | 7/2012 | Kishida et al. | ................ | 363/67 |
| 2009/0116268 A1 | 5/2009 | Kishida et al. | | |
| 2011/0280049 A1 * | 11/2011 | Mori et al. | ................ | 363/25 |

FOREIGN PATENT DOCUMENTS

| | | |
|---|---|---|
| CN | 101432957 A | 5/2009 |
| JP | 59-139868 A | 8/1984 |
| JP | 02-065667 A | 3/1990 |

(Continued)

OTHER PUBLICATIONS

A.H. Bhat, Pramod Agarwal, "Three-phase, power quality improvement AC/DC converters," Electric Power Syst. Res. 78 (2008), pp. 276-289.*

*Primary Examiner* — Adolf Berhane
*Assistant Examiner* — Jye-June Lee
(74) *Attorney, Agent, or Firm* — McDermott Will & Emery LLP

(57) ABSTRACT

A three-phase rectifier converts three-phase alternating current (AC) power supplied from a three-phase AC power supply into direct current (DC) power. The three-phase rectifier includes a full-wave rectifier circuit, a bidirectional switch circuit, and a controller. The full-wave rectifier circuit rectifies three-phase AC power to DC power. The bidirectional switch circuit switches on and off inputs of respective phases from the three-phase AC power supply to the full-wave rectifier circuit. The controller detects voltages of the respective phases of the three-phase AC power supply, generates switching patterns for the respective phases to switch the bidirectional switch circuit on and off based on the detected voltages of the phases, and controls switching of the bidirectional switch circuit based on the switching patterns.

7 Claims, 20 Drawing Sheets

(56) References Cited

FOREIGN PATENT DOCUMENTS

| JP | 09-275685 A | 10/1997 |
| JP | 2004-343975 A | 12/2004 |
| JP | 2005-143212 A | 6/2005 |

* cited by examiner

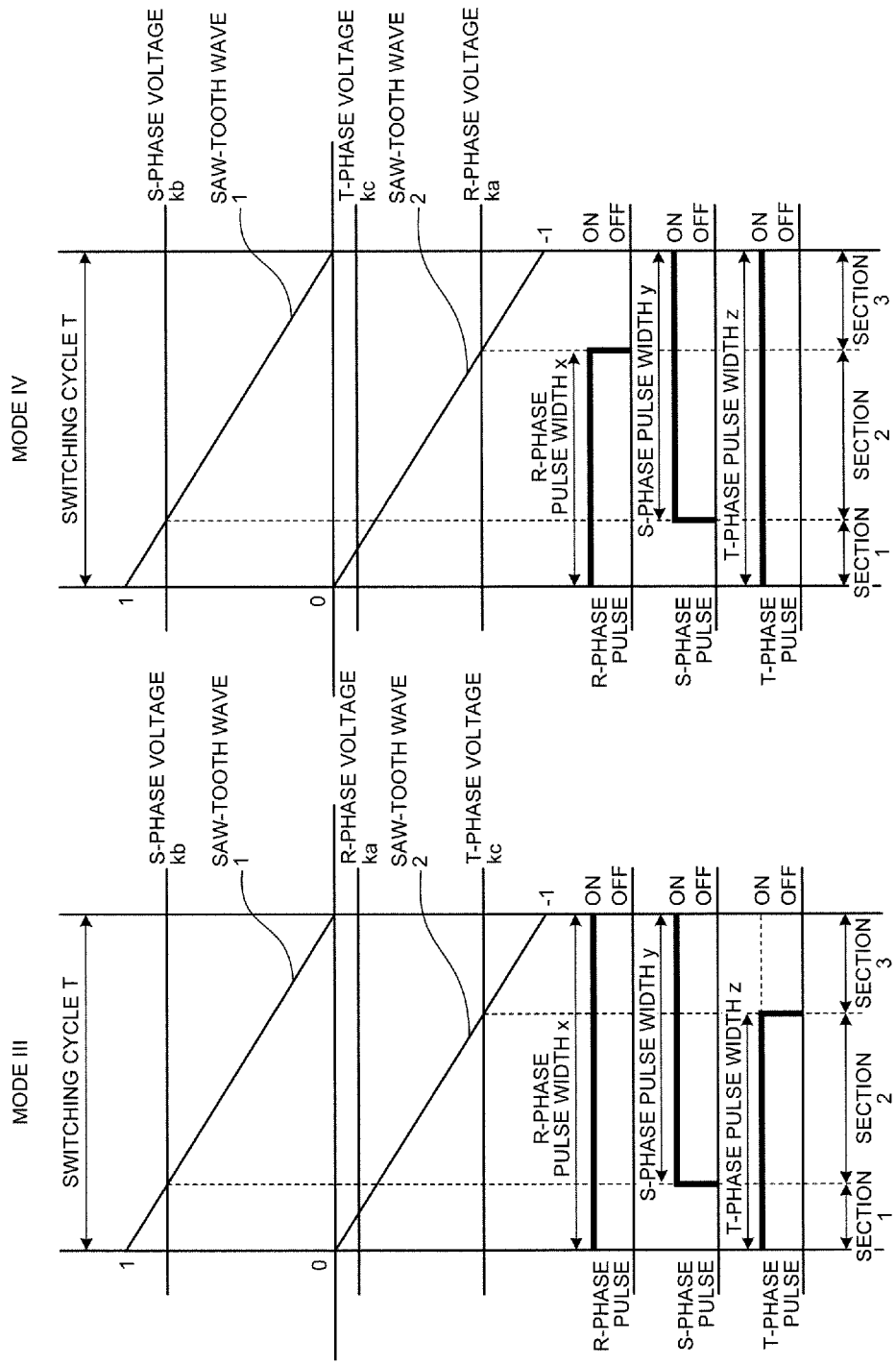

THREE-PHASE RECTIFIER WITH BIDIRECTIONAL SWITCHES

RELATED APPLICATIONS

This application is the U.S. National Phase under 35 U.S.C. §371 of International Application No. PCT/JP2010/060976, filed on Jun. 28, 2010, which in turn claims the benefit of Japanese Application No. 2010-110435, filed on May 12, 2010, and Japanese Application No. 2009-152770, filed on Jun. 26, 2009 the disclosures of which Applications are incorporated by reference herein.

TECHNICAL FIELD

The present invention relates to a three-phase rectifier that converts three-phase alternating current power into direct current power.

BACKGROUND ART

Generally, as a way to convert three-phase alternating current (AC) power into direct current (DC) power, a three-phase full-wave rectification system has been used. However, in the three-phase full-wave rectification system, there are two occasions where an electrical potential of each phase comes to an intermediate potential of the other two phases in one cycle period with a section width of 60 degrees. Since the section is a non-conductive section where no current flows, input current results in a waveform containing harmonic current. Besides, the DC voltage thereof traces the maximum voltage of input line voltage, and thus it results in a pulsating waveform.

As a way to reduce non-conductive sections of input and to reduce harmonic current, a passive method is used in which reactors of large capacity are connected to the input to store power and then to release the power during non-conductive sections to reduce the non-conductive sections. As a way to minimize non-conductive sections of input, an active method is used in which a PFC circuit or a PWM rectifier circuit is configured with semiconductors to compensate the non-conductive sections of the input with reactors of small capacity. As a way to remove DC voltage ripple, in both the passive and active methods, a capacitor of large capacitance is connected on the DC side.

Of the conventional methods, a passive system requires storage of power. Because reactors and capacitors of large capacity are required to store power in this system, it is costly and the circuit size becomes larger.

Meanwhile, in an active system, generally, DC voltage is detected to control input current, and thus a stable DC voltage is required. Because it is necessary to select a DC intermediate capacitor as a power storage device in consideration of fluctuation of DC voltage induced by fluctuation of load or input voltage, reduction in the capacitance thereof is limited. Further, the control is complicated, and a load of high withstand voltage is used since there is provided only a voltage step-up function, resulting in a high cost.

As a current type three-phase step-down rectifier used in an active system other than the above, for example, Patent Documents 1 and 2 are known. In Patent Document 1, a current type step-down converter is configured with self-extinguishing switching elements, and a section in which DC voltage is set to 0 by switching off all pulses or by a short-circuit pulse is inserted to the output of a rectifier to smooth out DC voltage and to reduce harmonic current. In Patent Document 2, downsizing of a DC reactor in this system is proposed. However, in the systems, DC voltage is not intended to be constant and components of power supply frequency cannot completely be eliminated, and thus the capacity of the reactor and the capacitor to absorb the power supply frequency components need to be at or above a certain level corresponding to a power supply frequency (for example, 50 Hz).

PRIOR ART REFERENCE

Patent Documents

Patent Document 1: Japanese Patent Application Laid-open No. S59-139868
Patent Document 2: Japanese Patent Application Laid-open No. 2005-143212

DISCLOSURE OF INVENTION

Problem to be Solved by the Invention

In view of the foregoing, it is an object of the present invention to provide a step-down type three-phase rectifier capable of reducing pulsation of DC voltage and harmonics of input current even when a capacitor and a reactor of small capacity are used.

Means for Solving Problem

To solve the problems and achieve the object mentioned above, according to the present invention, a three-phase rectifier converts three-phase alternating current (AC) power supplied from a three-phase AC power supply into direct current (DC) power. The three-phase rectifier includes a full-wave rectifier circuit, a bidirectional switch circuit, and a controller. The full-wave rectifier circuit rectifies three-phase AC power to DC power. The bidirectional switch circuit switches on and off inputs of respective phases from the three-phase AC power supply to the full-wave rectifier circuit. The controller detects voltages of the respective phases of the three-phase AC power supply, generates switching patterns for the respective phases to switch the bidirectional switch circuit on and off based on the detected voltages of the phases, and controls switching of the bidirectional switch circuit based on the switching patterns.

According to an aspect of the present invention, preferably, the controller detects a maximum potential phase, an intermediate potential phase, and a minimum potential phase in the voltages of the respective phases of the three-phase AC power supply. The controller generates, for the maximum potential phase and the minimum potential phase, switching patterns for switching on for a time proportional to respective potentials, at least one of which is ON in the switching cycle. Meanwhile, the controller generates, for the intermediate potential phase, a switching pattern for switching on constantly.

According to an aspect of the present invention, preferably, a capacitor is connected between the three-phase AC power supply and the bidirectional switch circuit.

According to an aspect of the present invention, preferably, a DC reactor is connected between the full-wave rectifier circuit and a load.

According to an aspect of the present invention, preferably, the controller divides the three-phase AC power into a plurality of modes according to the magnitude relation of the voltages of the respective phases and generates different switching patterns for the respective phases in each mode. The switching patterns have the same regularity for the same phase in all the modes.

According to an aspect of the present invention, preferably, the switching patterns for the respective phases have a predetermined switching cycle. The controller introduces a period in which the bidirectional switch circuit is switched off for at least two phases in the switching cycle.

According to an aspect of the present invention, preferably, the controller inserts zero voltage to a switching pattern for one phase.

Effect of the Invention

According to the present invention, a three-phase rectifier converts three-phase alternating current (AC) power supplied from a three-phase AC power supply into direct current (DC) power. The three-phase rectifier includes a full-wave rectifier circuit, a bidirectional switch circuit, and a controller. The full-wave rectifier circuit rectifies three-phase AC power to DC power. The bidirectional switch circuit switches on and off inputs of respective phases from the three-phase AC power supply to the full-wave rectifier circuit. The controller detects voltages of the respective phases of the three-phase AC power supply, generates switching patterns for the respective phases to switch the bidirectional switch circuit on and off based on the detected voltages of the phases, and controls switching of the bidirectional switch circuit based on the switching patterns. With this, it is possible to provide a three-phase rectifier capable of reducing pulsation of DC voltage and harmonics of input current even when a capacitor and a reactor of small capacity are used.

BRIEF DESCRIPTION OF DRAWINGS

FIG. 11B is a pair of charts illustrating examples of R-, S-, and T-phase control voltages ka, kb, and kc, saw-tooth waves 1 and 2, and R-, S-, and T-phase pulses of the first embodiment in mode III and mode IV.

EXPLANATIONS OF LETTERS OR NUMERALS

1 THREE-PHASE AC POWER SUPPLY
2 DC REACTOR
3 BIDIRECTIONAL SWITCH CIRCUIT
4 FULL-WAVE RECTIFIER CIRCUIT
5 SWITCHING PATTERN GENERATOR
6 DRIVE CIRCUIT
7 LOAD
8 THREE-PHASE REACTOR
9 INPUT CAPACITOR
11 PATTERN SIGNAL GENERATOR
12 VOLTAGE SETTER
13 PHASE VOLTAGE DISCRIMINATOR
14R to 14T, 15R to 15T COMPARATOR
16R to 16T, 17R to 17T, 18R to 18T AND CIRCUIT
19R to 19T OR CIRCUIT
51 PATTERN SIGNAL GENERATOR
52 PHASE VOLTAGE DISCRIMINATOR
53 DC VOLTAGE SETTER
54 SAW-TOOTH WAVE GENERATOR
55-1 to 55-3 COMPARATOR
56-1, 56-2 NOT CIRCUIT
57-1, 57-2 OR CIRCUIT
58-1, 58-2 NOT CIRCUIT
59-1, 59-2 AND CIRCUIT
60R, 60T AND CIRCUIT
60S OR CIRCUIT
61R to 61T NAND CIRCUIT
62R to 62T AND CIRCUIT
63R to 63T OR CIRCUIT
64 AND CIRCUIT

BEST MODE(S) FOR CARRYING OUT THE INVENTION

Exemplary embodiments of the present invention will be described in detail below with reference to the accompanying drawings. However, the present invention is not limited by the following embodiments. Besides, the constituent elements of the following embodiments may include those that can be easily conceived by a person of ordinary skill in the art or those that are substantially the same.

First Embodiment

[Configuration Example of Three-phase Rectifier]

Figure 1:
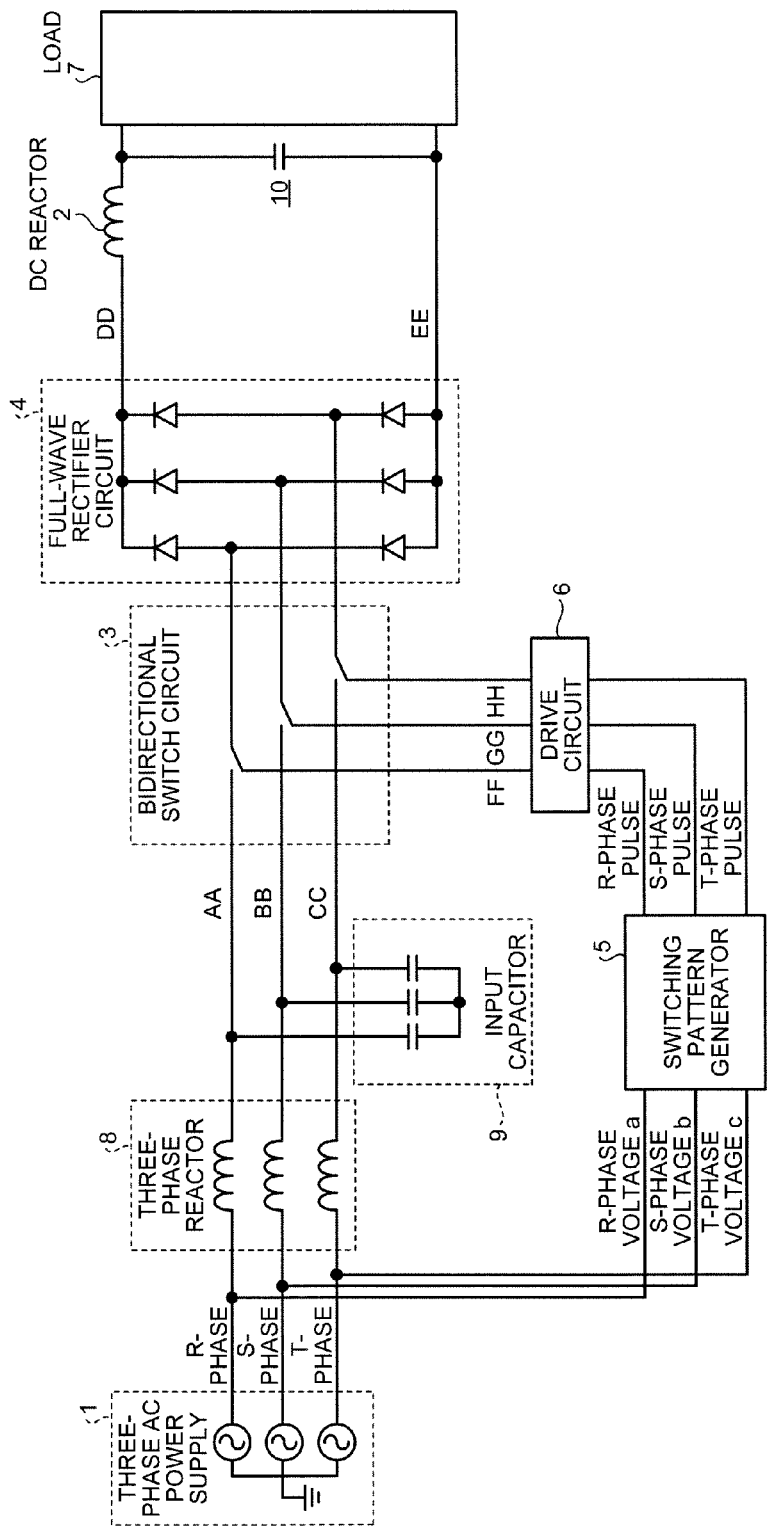
FIG. 1 is a schematic circuit diagram illustrating a configuration example of a power convertor that employs a step-down type three-phase rectifier according to an embodiment of the present invention.

FIG. 1 is a schematic circuit diagram illustrating a configuration example of a power convertor that employs a step-down type three-phase rectifier according to a first embodiment of the present invention. The power convertor of the present embodiment includes, as illustrated in FIG. 1, a three-phase alternating current (AC) power supply 1 that generates R-, S-, and T-phase voltages, a three-phase reactor 8, and an input capacitor 9 connected on an output side of the three-phase AC power supply 1, a full-wave rectifier circuit 4 including 6 diodes that rectifies three-phase voltages to a direct current (DC) voltage, a bidirectional switch circuit 3 that switches on and off inputs to respective phases of the full-wave rectifier circuit 4, a switching pattern generator 5 that detects phase voltages of three-phases and generates switching patterns for the bidirectional switch circuit 3, a drive circuit 6 that controls switching of switching elements of the bidirectional switch circuit 3 based on the switching patterns generated by the switching pattern generator 5, a DC reactor 2 and a capacitor 10 connected on an output side of the full-wave rectifier circuit 4, and a load 7 connected in parallel with the capacitor 10 and supplied with DC power.

In the configuration above, the switching pattern generator 5 and the drive circuit 6 function as a controller that detects voltages of respective phases of the three-phase AC power supply 1, generates switching patterns for the respective phases to switch on and off the bidirectional switch circuit 3 based on the voltages of the respective phases detected, and controls switching of the bidirectional switch circuit 3 based on the switching patterns generated.

Figure 2:
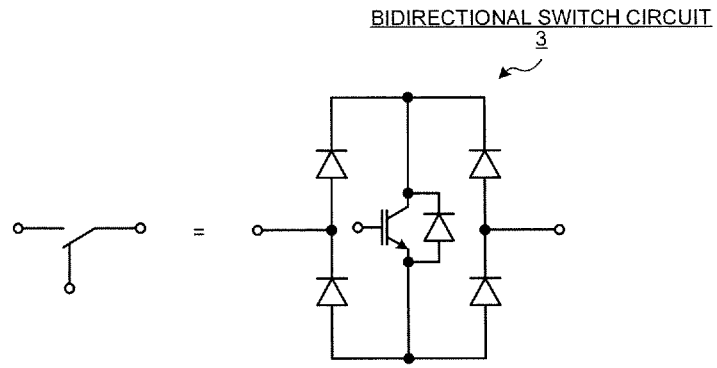
FIG. 2 is a schematic circuit diagram illustrating a configuration example of a switch of a bidirectional switch circuit for a single phase.

FIG. 2 is a schematic circuit diagram illustrating a configuration example of a switch of the bidirectional switch circuit 3 for a single phase. The bidirectional switch circuit 3 illustrated in FIG. 2 is a known circuit configured with diodes and a switching element such as an IGBT, and thus its detailed explanation is omitted.

[Configuration Example of Switching Pattern Generator]

Figure 3:
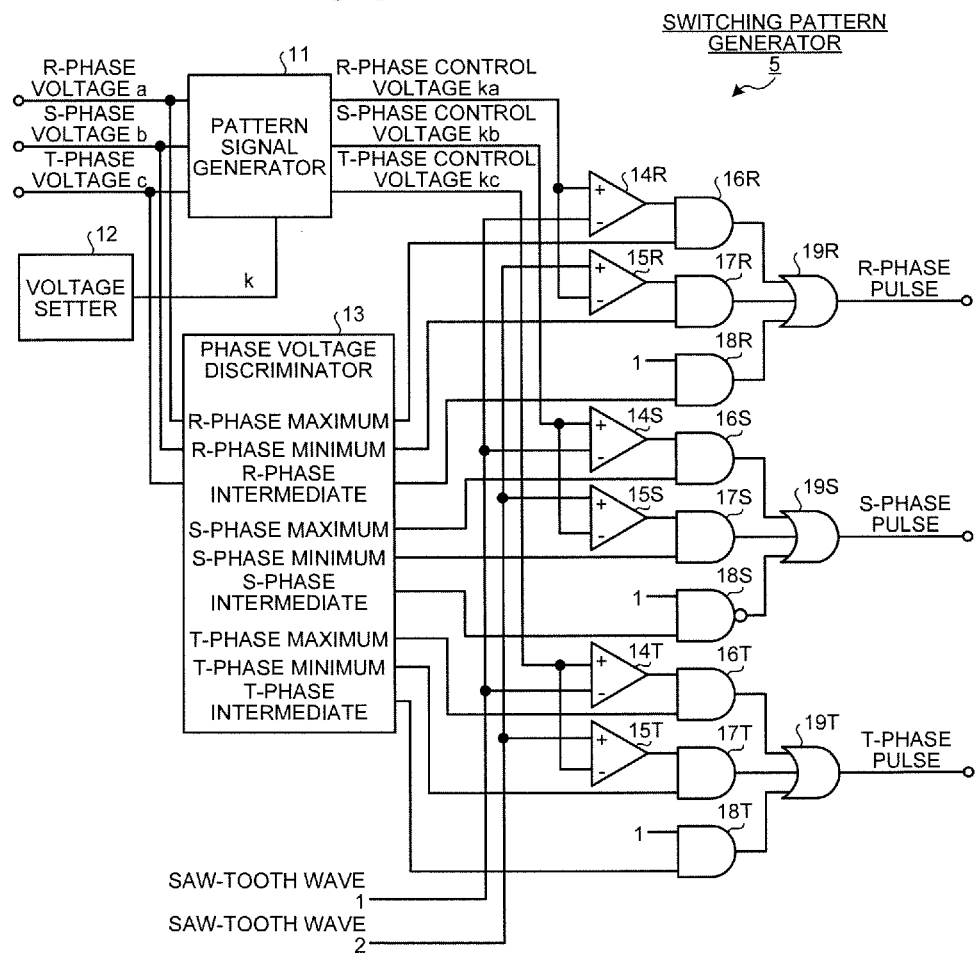
FIG. 3 is a circuit block diagram illustrating a configuration example of a switching pattern generator.
Figure 4:
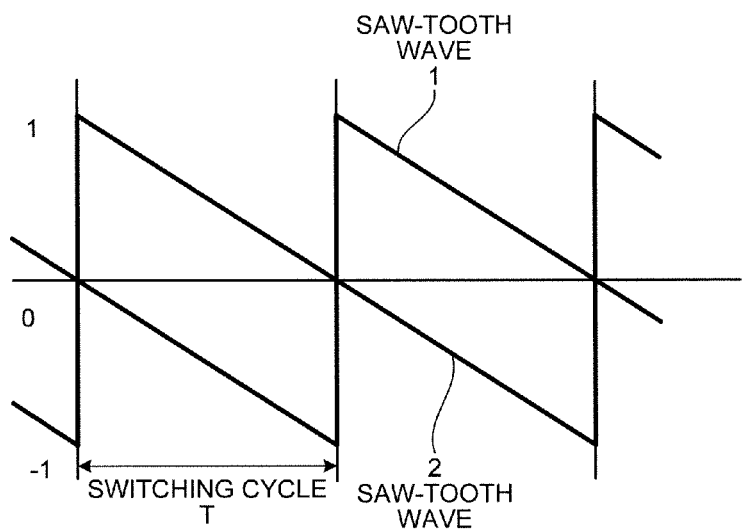
FIG. 4 is a diagram illustrating example waveforms of saw-tooth waves 1 and 2 used when generating switching patterns in the switching pattern generator.
Figure 5:
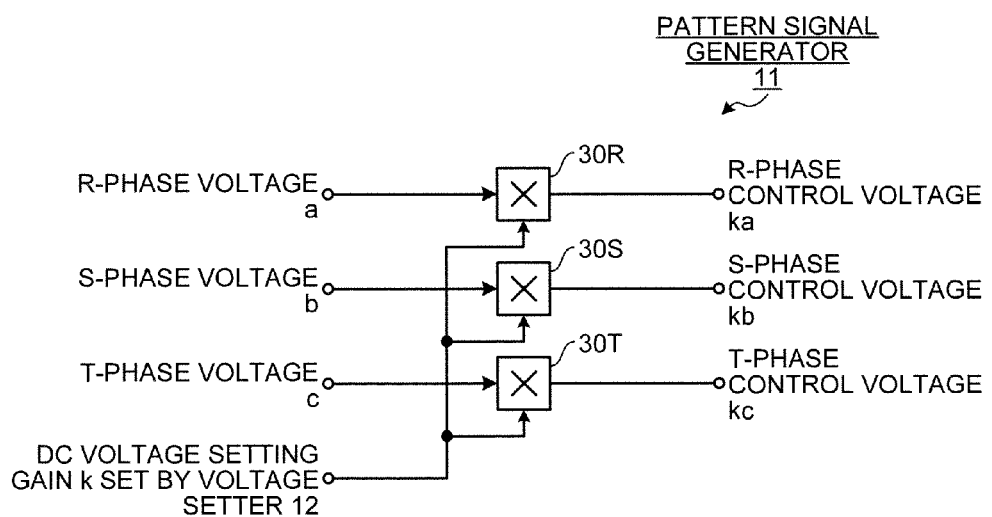
FIG. 5 is a schematic circuit diagram illustrating a configuration example of a pattern signal generator in FIG. 3.
Figure 6:
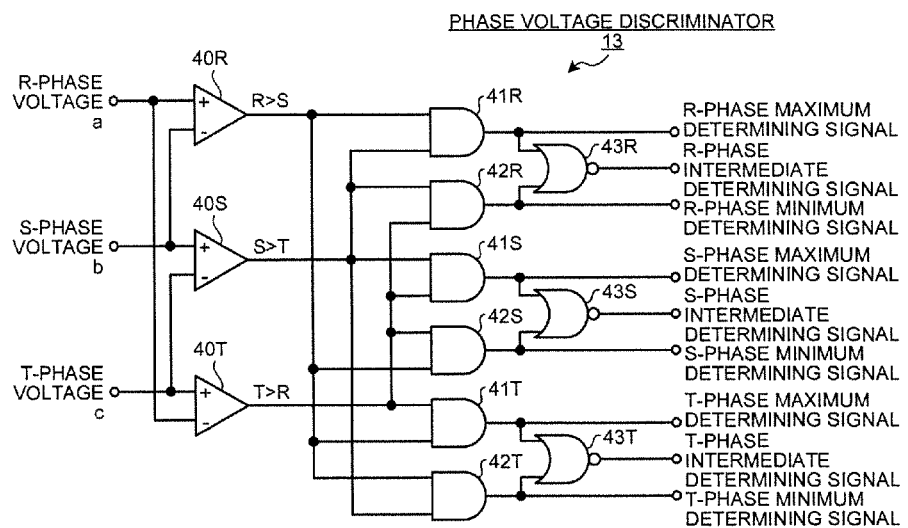
FIG. 6 is a schematic circuit diagram illustrating a configuration example of a phase voltage discriminator in FIG. 3.

FIG. 3 is a circuit block diagram illustrating an example of the switching pattern generator 5. FIG. 4 is a diagram illustrating example waveforms of saw-tooth waves 1 and 2 used when generating switching patterns in the switching pattern generator 5. FIG. 5 is a schematic circuit diagram illustrating a configuration example of a pattern signal generator 11 of the switching pattern generator 5. FIG. 6 is a schematic circuit diagram illustrating a configuration example of a phase voltage discriminator 13 of the switching pattern generator 5.

The switching pattern generator 5 generates switching patterns (R-, S-, and T-phase pulses) for the bidirectional switch circuit 3 as explained in the followings to suppress pulsation of DC voltage and harmonics of input current. The switching pattern generator 5, at a predetermined timing such as a rising edge of switching cycles, detects a maximum potential phase, an intermediate potential phase, and a minimum potential phase in the voltage of respective phases of the three-phase AC power supply 1, and then generates, for the maximum potential phase and the minimum potential phase, switching patterns for switching on for a time proportional to the respective potentials, at least one of which is ON in a switching cycle T, and generates, for the intermediate potential phase, a switching pattern for switching on constantly (see FIG. 8 described later). The switching cycle T is decided to be a sufficiently short cycle (for example, $\frac{1}{100}$ kHz=10 μsec) with respect to a power supply frequency (for example, 50 Hz).

The switching pattern generator 5 includes, as illustrated in FIG. 3, the pattern signal generator 11, a voltage setter 12, the phase voltage discriminator 13, comparators 14R to 14T, comparators 15R to 15T, AND circuits 16R to 16T, AND circuits 17R to 17T, AND circuits 18R to 18T, and OR circuits 19R to 19T.

The voltage setter 12 sets to the pattern signal generator 11 a DC voltage setting gain k (where k=0.5 to 1) determined corresponding to a DC voltage setting value (a target voltage to step down).

The pattern signal generator 11 normalizes the R-, S-, and T-phase voltages a, b, and c to −1 to +1, respectively, and then calculates the products of the normalization results and a DC voltage setting gain k (0.5 to 1) input from the voltage setter 12, and outputs the results as R-phase, S-phase, and T-phase control voltages ka, kb, and kc, respectively.

The phase voltage discriminator 13 compares R-, S-, and T-phase voltages a, b, and c to discriminate which phase voltage is maximum, minimum, and intermediate, and outputs maximum determining signals (1 when maximum, and 0 when not maximum), minimum determining signals (1 when minimum, and 0 when not minimum), and intermediate determining signals (1 when intermediate, and 0 when not intermediate) of the R-, S-, and T-phases, respectively.

The comparators 14R to 14T compare R-phase, S-phase, and T-phase control voltages ka, kb, and kc with a saw-tooth wave 1 (see FIG. 4), respectively, and output respective comparison signals. The comparators 15R to 15T compare R-phase, S-phase, and T-phase control voltages ka, kb, and kc with a saw-tooth wave 2 (see FIG. 4), respectively, and output respective comparison signals. The AND circuits 16R to 16T carry out AND operations of the comparison signals of the comparators 14R to 14T and R-, S-, and T-phase maximum determining signals, respectively. The AND circuits 17R to 17T carry out AND operations of the comparison signals of the comparators 15R to 15T and R-, S-, and T-phase minimum determining signals, respectively. The AND circuits 18R to 18T carry out AND operations of a fixed value of 1 and R-, S-, and T-phase intermediate determining signals, respectively. The OR circuits 19R to 19T carry out OR operations of outputs of the AND circuits 16R to 18R, outputs of the AND circuits 16S to 18S, and outputs of the AND circuits 16T to 18T, respectively, and output the respective results as final R-, S-, and T-phase pulses (switching patterns) to the drive circuit 6.

The operations concerning the R-phase will be explained. The comparator 14R compares an R-phase control voltage ka input from the pattern signal generator 11 with a saw-tooth wave 1, and outputs a comparison signal (1 when R-phase control voltage ka>saw-tooth wave 1, and 0 when R-phase control voltage ka≤saw-tooth wave 1) to the AND circuit 16R. The AND circuit 16R carries out an AND operation of the comparison signal input from the comparator 14R and an R-phase maximum determining signal, and outputs the result to the OR circuit 19R.

The comparator 15R compares a saw-tooth wave 2 with an R-phase control voltage ka input from the pattern signal generator 11, and outputs a comparison signal (1 when saw-tooth wave 2>R-phase control voltage ka, and 0 when saw-tooth wave 2≤R-phase control voltage ka) to the AND circuit 17R. The AND circuit 17R carries out an AND operation of the comparison signal input from the comparator 15R and an R-phase minimum determining signal, and outputs the result to the OR circuit 19R.

The AND circuit 18R carries out an AND operation of a fixed signal of 1 and an R-phase intermediate determining signal, and outputs the result to the OR circuit 19R. The OR circuit 19R carries out an OR operation of the outputs of the AND circuits 16R to 18R, and outputs the result as a final R-phase pulse.

The operations concerning the S-phase will be explained. The comparator 14S compares an S-phase control voltage kb input from the pattern signal generator 11 with a saw-tooth wave 1, and outputs a comparison signal (1 when S-phase control voltage kb>saw-tooth wave 1, and 0 when S-phase control voltage kb≤saw-tooth wave 1) to the AND circuit 16S. The AND circuit 16S carries out an AND operation of the comparison signal input from the comparator 14S and an S-phase maximum determining signal, and outputs the result to the OR circuit 19S.

The comparator 15S compares a saw-tooth wave 2 with an S-phase control voltage kb input from the pattern signal generator 11, and outputs a comparison signal (1 when saw-tooth wave 2>S-phase control voltage kb, and 0 when saw-tooth wave 2≤S-phase control voltage kb) to the AND circuit 17S. The AND circuit 17S carries out an AND operation of the comparison signal input from the comparator 15S and an S-phase minimum determining signal, and outputs the result to the OR circuit 19S.

The AND circuit 18S carries out an AND operation of a fixed signal of 1 and an S-phase intermediate determining signal, and outputs the result to the OR circuit 19S. The OR circuit 19S carries out an OR operation of the outputs of the AND circuits 16S to 18S, and outputs the result as a final S-phase pulse.

The operations concerning the T-phase will be explained. The comparator 14T compares a T-phase control voltage kc input from the pattern signal generator 11 with a saw-tooth wave 1, and outputs a comparison signal (1 when T-phase control voltage kc>saw-tooth wave 1, and 0 when T-phase control voltage kc≤saw-tooth wave 1) to the AND circuit 16T. The AND circuit 16T carries out an AND operation of the comparison signal input from the comparator 14T and a T-phase maximum determining signal, and outputs the result to the OR circuit 19T.

The comparator 15T compares a saw-tooth wave 2 with a T-phase control voltage kc input from the pattern signal generator 11, and outputs a comparison signal (1 when saw-tooth wave 2>T-phase control voltage kc, and 0 when saw-tooth wave 2≤T-phase control voltage kc) to the AND circuit 17T. The AND circuit 17T carries out an AND operation of the comparison signal input from the comparator 15T and a T-phase minimum determining signal, and outputs the result to the OR circuit 19T.

The AND circuit 18T carries out an AND operation of a fixed signal of 1 and a T-phase intermediate determining signal, and outputs the result to the OR circuit 19T. The OR circuit 19T carries out an OR operation of the outputs of the AND circuits 16T to 18T, and outputs the result as a final T-phase pulse.

The pattern signal generator 11 includes, as illustrated in FIG. 5, multipliers 30R, 30S, and 30T that carry out multiplication of R-, S-, and T-phase voltages a, b, and c and a DC voltage control gain k output from the voltage setter 12 to output R-, S-, and T-phase control patterns ka, kb, and kc, respectively.

The phase voltage discriminator 13 includes, as illustrated in FIG. 6, comparators 40R, 40S, and 40T, AND circuits 41R, 41S, and 41T, AND circuits 42R, 42S, and 42T, and NOR circuits 43R, 43S, and 43T.

The comparator 40R compares an R-phase voltage a with an S-phase voltage b, and outputs a comparison signal (1 when R-phase voltage a>S-phase voltage b, and 0 when R-phase voltage a≤S-phase voltage b) to the AND circuits 41R, 42S, 41T, and 42T. The comparator 40S compares an S-phase voltage b with a T-phase voltage c, and outputs a comparison signal (1 when S-phase voltage b>T-phase voltage c, and 0 when S-phase voltage b≤T-phase voltage c) to the AND circuits 41R, 42R, 41S, and 42T. The comparator 40T compares a T-phase voltage c with an R-phase voltage a, and outputs a comparison signal (1 when T-phase voltage c>R-phase voltage a, and 0 when T-phase voltage c≤R-phase voltage a) to the AND circuits 42R, 41S, 42S, and 41T.

The AND circuit 41R outputs the result of an AND operation of the comparison signal of the comparator 40R and the comparison signal of the comparator 40S as an R-phase maximum determining signal. The AND circuit 42R outputs the result of an AND operation of the comparison signal of the comparator 40S and the comparison signal of the comparator 40T as an R-phase minimum determining signal. The AND circuit 41S outputs the result of an AND operation of the comparison signal of the comparator 40S and the comparison signal of the comparator 40T as an S-phase maximum determining signal. The AND circuit 42S outputs the result of an AND operation of the comparison signal of the comparator 40T and the comparison signal of the comparator 40R as an S-phase minimum determining signal. The AND circuit 41T outputs the result of an AND operation of the comparison signal of the comparator 40T and the comparison signal of the comparator 40R as a T-phase maximum determining signal. The AND circuit 42T outputs the result of an AND operation of the comparison signal of the comparator 40R and the comparison signal of the comparator 40S as a T-phase minimum determining signal.

The NOR circuit 43R outputs the result of a NOR operation of an R-phase maximum determining signal and an R-phase minimum determining signal as an R-phase intermediate determining signal. The NOR circuit 43S outputs the result of a NOR operation of an S-phase maximum determining signal and an S-phase minimum determining signal as an S-phase intermediate determining signal. The NOR circuit 43T outputs the result of a NOR operation of a T-phase maximum determining signal and a T-phase minimum determining signal as a T-phase intermediate determining signal.

[Principle of Reducing DC Voltage Pulsation and Input Current Harmonics in First Embodiment]

Figure 7:
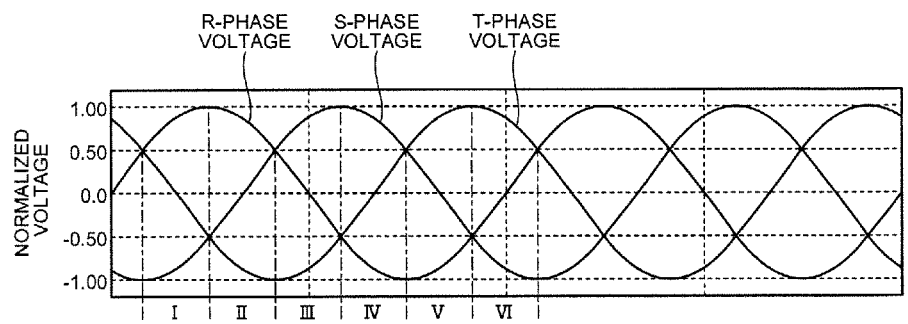
FIG. 7 is a graph for explaining respective sections of an R-phase voltage, an S-phase voltage, and a T-phase voltage.
Figure 8:
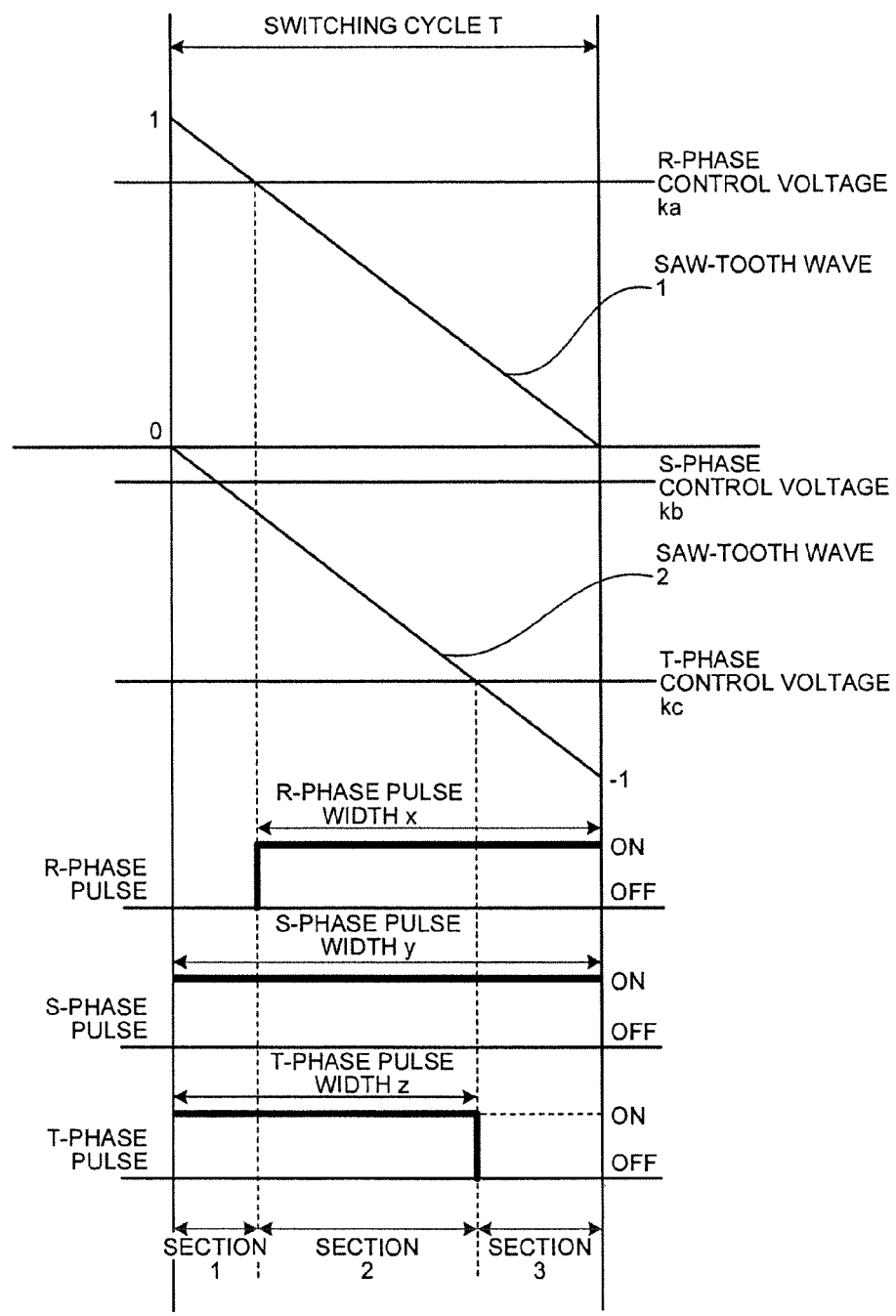
FIG. 8 is a chart illustrating examples of R-, S-, and T-phase control voltages ka, kb, and kc, respectively, saw-tooth waves 1 and 2, and R-, S-, and T-phase pulses.

The principle of reducing pulsation of DC voltage and harmonics of input current in the present embodiment will be explained. In the present embodiment, that switching the bidirectional switch circuit 3 in the following manner by the switching pattern generator 5 and the drive circuit 6 reduces pulsation of DC voltage and harmonics of input current. FIG. 7 is a graph for explaining respective sections of an R-phase voltage, an S-phase voltage, and a T-phase voltage. FIG. 8 is a chart illustrating examples of R-, S-, and T-phase control voltages ka, kb, and kc, saw-tooth waves 1 and 2, and R-, S-, and T-phase pulses (switching patterns).

The DC voltages will be explained, first. In FIG. 7, a three-phase AC voltage is divided into six modes (sections) of mode I to mode VI according to magnitude relation of an R-phase voltage, an S-phase voltage, and a T-phase voltage: a state of R>T>S is defined as mode I; a state of R>S>T is defined as mode II; a state of S>R>T is defined as mode III; a state of S>T>R is defined as mode IV; a state of T>S>R is defined as mode V; and a state of T>R>S is defined as mode VI.

A situation of section II where the R-phase is maximum, the S-phase is intermediate, and the T-phase is minimum will be explained. An R-phase voltage a, an S-phase voltage b, and a T-phase voltage c are, as described above, voltages of respective phases being normalized to between −1 and 1. The DC voltage setting gain k is, as described above, a gain determined in the voltage setter 12 corresponding to a DC voltage setting value, and is a constant between 0.5 and 1. A DC voltage setting gain k is multiplied to an R-phase voltage a, an S-phase voltage b, and a T-phase voltage c in the pattern signal generator 11, and the multiplied R-phase control voltage ka, the S-phase control voltage kb, and the T-phase control voltage kc form waveforms intersecting saw-tooth waves 1 and 2 (see FIG. 8).

In FIG. 8, a letter T represents switching cycle, a letter x represents an R-phase pulse width, a letter y represents an S-phase pulse width, and a letter z represents a T-phase pulse width. The DC voltages at sections 1, 2, and 3 are as follows: section 1 voltage=S−T line voltage=b−c; section 2 voltage=R−T line voltage=a−c; and section 3 voltage=R−S line voltage=a−b. The width of the section 1 is T−x, the width of the section 2 is x−(T−z)=x+z−T, and the width of the section 3 is T−z. Meanwhile, an R-phase pulse width x is obtained as x=kaT from T:x=1:ka, and a T-phase pulse width z is obtained as z=−kcT from T:z=1:−kc. Therefore, the width of the section 1 is T−x=T−kaT=T(1−ka), the width of the section 3 is T−z=T−(−kcT)=T(1+kc), and the width of the section 2 is x+z−T=kaT−(−kcT)−T=T(ka−kc−1).

By multiplying DC voltages for the respective sections, adding the respective results, and dividing the sum by the switching cycle T, the average of DC voltages in the switching cycle T can be expressed as follows:

average voltage in switching cycle $T = \{(b-c) \times T \times (1-ka) + (a-c) \times T \times (ka-kc-1) + (a-b) \times T \times (1+kc)\}/T = k(a^2+b^2) - kb(a+c)$ with the consideration of a+b+c=0 (three-phase condition), $= k(a^2+b^2+c^2)$ further, from $a^2+b^2+c^2=3/2$ in AC theory, $= k \times 3/2$ The average voltage in the switching cycle T above is expressed based on phase voltages.

Consequently, the average value of DC voltages in the switching section becomes constant, i.e., the DC voltage setting gain k×3/2, and is proportional to the DC voltage setting gain k that is compared with saw-tooth waves 1 and 2. Accordingly, selecting a DC voltage setting gain k can control the magnitude of DC voltage obtained by step-down. Because an R-phase pulse and a T-phase pulse are both switched on in the switching cycle T, the minimum value of the DC voltage setting gain k is 0.5, and because an R-phase control voltage ka, an S-phase control voltage kb, and a T-phase control voltage kc do not exceed saw-tooth waves 1 and 2, the maximum value of the DC voltage setting gain k is 1. Therefore, the available setting range of k is within the range of 0.5 to 1.

Next, the input currents will be explained. As an R-phase input current, a positive current flows proportional to the time of an R-phase control voltage ka. As a T-phase input current, a negative current flows proportional to an absolute value |kc| of a T-phase control voltage kc, i.e., proportional to the T-phase control voltage kc. As an S-phase input current, positive current flows at the section 1=T×(1−ka), and negative current flows at the section 3=T×(1+kc). Accordingly, the positive current that flows is represented by T×(1−ka)−T×(1+kc)=T×(−ka−kc)=T×k×(−a−c)=T×k×b, and dividing the average in the switching cycle T by the switching cycle T results in an S-phase control voltage kb. Consequently, the currents of the R-phase, the S-phase, and the T-phase flow proportionally to an R-phase control voltage ka, an S-phase control voltage kb, and a T-phase control voltage kc, respectively, resulting in that the current proportional to input voltages flows on average.

The DC voltages and input currents by the present switching are summarized as follows:
(1) An average value of DC voltages in a switching cycle T comes to a step-down constant voltage value.
(2) An average value of input currents in a switching cycle T is distributed by the ratio of input voltages.

The fact that the input current becomes a sine wave will be explained. An R-phase voltage of a three-phase AC voltage is defined as V sin(ωt), an S-phase voltage thereof is defined as V sin(ωt+120), and a T-phase voltage thereof is defined as V sin(ωt+240). From the above-described summary (2), the input currents can be generalized to be written as I(t)sin(ωt) for an R-phase current, I(t)sin(ωt+120) for an S-phase current, and I(t)sin(ωt+240) for a T-phase current, where I(t) is an amplitude of input current.

At this time, an input power P can be expressed as follows:

$P = V\sin(\omega t) \times I(t)\sin(\omega t) + V\sin(\omega t+120) \times I(t)\sin(\omega t+120) V\sin(\omega t+240) + I(t)\sin(\omega t+240)$ $= V \times I(t)\sin^2(\omega t) + V \times I(t)\sin^2(\omega t+120) + V \times I(t)\sin^2(\omega t+240)$ $= V \times I(t) \{\sin(\omega t) + \sin^2(\omega t+120) + \sin^2(\omega t+240)\}$ Inside the curly brackets { } is calculated to be a constant of 3/2.

Thus, P=V×I(t)×3/2 is modified as I(t)=P/V×2/3.

When power P is constant, because V is constant, I(t) becomes a time-independent constant value. In other words, the input current is a sine wave.
(3) Under the condition of the above-described summary (2), when power is constant, input current becomes a sine wave.

In the above-described circuit in FIG. 1, because the above-described switching is carried out by the switching pattern generator 5 and the drive circuit 6, and the DC reactor 2 that removes fluctuation of DC voltage within a switching cycle T is connected on the output side of the full-wave rectifier circuit 4, the DC voltage becomes constant based on the above-described summary (1). In general, in a short period of time (about 100 msec), a load can be assumed to be of constant power. Connecting the input capacitor 9 that removes input current fluctuation within the switching cycle T on the input side of the bidirectional switch circuit 3 makes the input current a sine wave based on the above-described summary (3).

[Simulations]

Figure 9:
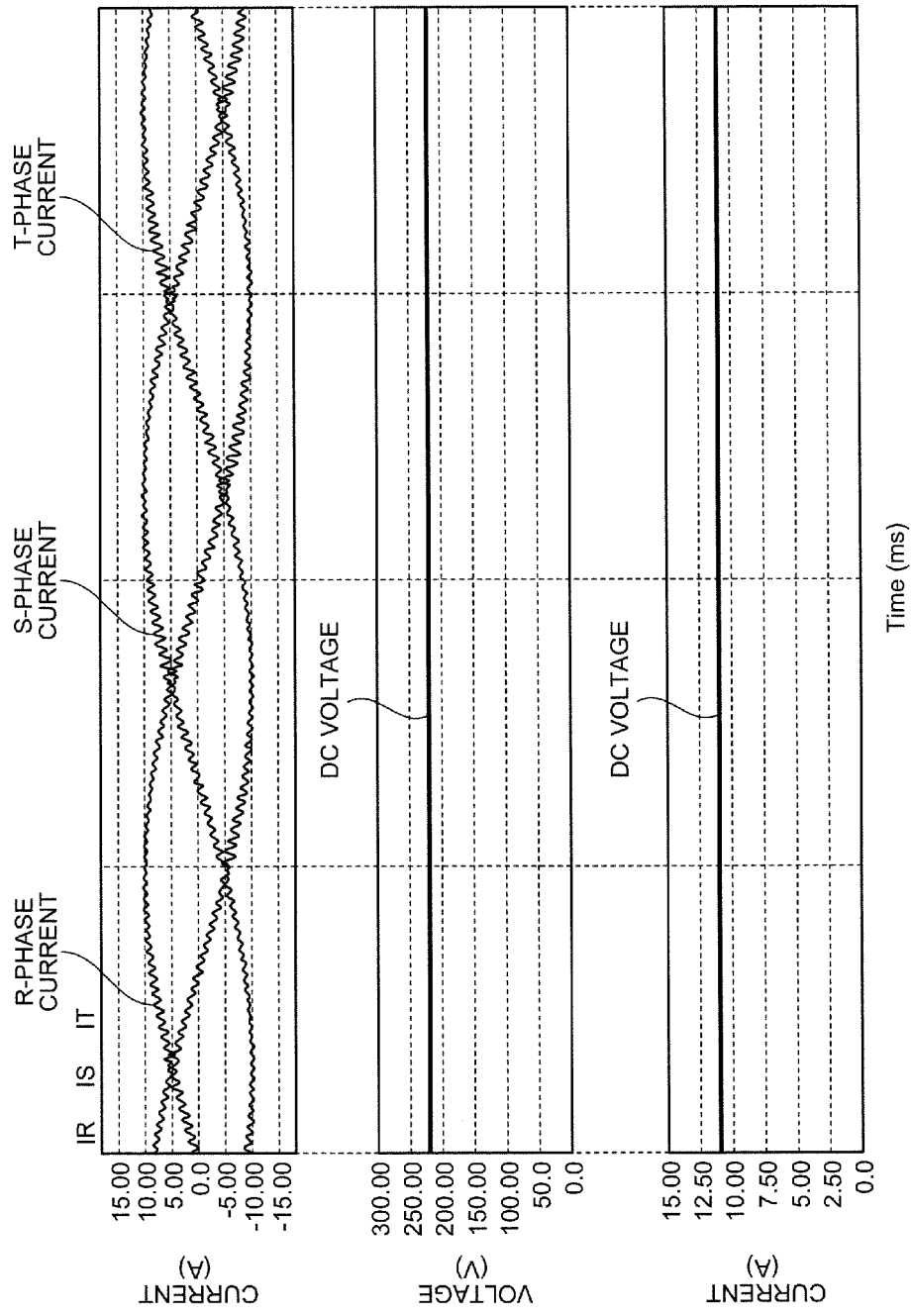
FIG. 9 is a graph illustrating simulation results of DC voltage and DC current of the circuit in FIG. 1.

With reference to FIG. 9, simulation results of DC voltage and DC current by the present embodiment will be described. FIG. 9 illustrates simulation results of DC voltage and DC current of the circuit in FIG. 1. In the circuit in FIG. 1, the simulation was carried out under the condition of a three-phase DC input voltage of 200 V (line voltage), a load resistance of 20Ω as the load 7, the input three-phase reactor 8 of 100 μH in consideration of system reactance, the input capacitor 9 of 3 μF/phase, the capacitor 10 of 2 μF, the DC reactor 2 of 2 mH, a switching frequency of 50 kHz, and the DC voltage setting gain k of 0.9. While the lower limit voltage of ripple in full-wave rectification of three-phase voltages (a maximum voltage that can be taken out as DC voltage) is $200 \times 2^{1/2} \times (3^{1/2}/2) = 245$ V, as illustrated in FIG. 9, in the present embodiment, the DC voltage is constant at about 220 VDC, which follows theory, and is stepped down. Furthermore, the DC current is also constant, and although the fluctuations associated with switching are present, the input currents are in sinusoidal waveforms. The above simulation is based on the line voltage, and the DC voltage is the voltage at both ends of the load 7 and the DC current is the current that flows in the load 7.

Consequently, it has been confirmed that the circuit configuration and the switching method (method of generating fixed pulse patterns corresponding to DC voltages) of the first embodiment makes the waveform of input currents a sine wave with reduced harmonics and makes the DC voltage constant. The input capacitor 9 and the DC reactor 2 are for the purpose of removing ripple current and ripple voltage within the switching cycle T, and thus can be made quite small in capacity, and setting the switching cycle T larger allows the capacity to be made further smaller.

When the load 7 has an inductance in series that renders a function to make a DC voltage constant, the DC reactor 2 in FIG. 1 can be omitted. When an inverter is connected to the DC output and there is ripple current dependent on a carrier present, the capacitor 10 that removes the ripple only needs to be mounted. When input system impedance is low and fluctuation of DC current within the switching cycle T leaks to the input system, the three-phase reactor 8 only needs to be connected on the input side. Therefore, in the present embodiment, the three-phase reactor 8 and the capacitor 10 are optional constituent elements. In other words, the capacitor and reactor have no relation to conventionally required smoothing of ripple dependent on a power supply frequency.

As described above, according to the first embodiment, the full-wave rectifier circuit 4 rectifies three-phase AC power to DC power. The bidirectional switch circuit 3 switches on and off inputs of the respective phases from the three-phase AC power supply 1 to the full-wave rectifier circuit 4. The controller (the switching pattern generator 5 and the drive circuit 6) that detects the voltages of the respective phases of the three-phase AC power supply, generates the switching patterns for the respective phases to switch on and off the bidirectional switch circuit 3 based on the detected voltages of the respective phases, and controls switching of the bidirectional switch circuit 3 based on the switching patterns. This makes it possible to provide a three-phase rectifier capable of reducing pulsation of DC voltage and harmonics of input current even when a capacitor and a reactor of small capacity are used.

Moreover, according to the first embodiment, the switching patterns for the respective phases have a predetermined switching cycle. The controller detects a maximum potential phase, an intermediate potential phase, and a minimum potential phase in the voltages of the respective phases of the three-phase power supply. The controller generates, for the maximum potential phase and the minimum potential phase, switching patterns for switching on for a time proportional to the respective potentials, at least one of which is ON in the switching cycle. The controller generates, for the intermediate potential phase, a switching pattern for switching on constantly. This allows input currents to be of a sine wave with reduced harmonics and DC voltage to be constant.

In addition, according to the first embodiment, the conventionally required reactor of large capacity (for example, several tens of mH) and capacitor of large capacitance (for example, several hundreds of µF) as energy storage elements targeting a power supply frequency (for example, 50 Hz) can be changed to energy storage elements targeting a switching frequency (for example, 100 kHz). In other words, the capacity of the reactor and capacitor depends only on a switching frequency, but not on input frequency components, and thus it can be quite small. Besides, while it is necessary to detect DC voltage to control input current in the conventional PFCs and PWM converters, the present embodiment can make it unnecessary. Moreover, the PFCs and PWM converters have a step-up function only, and in a 400 V input system, the voltage of DC intermediate circuit is high, and thus it is necessary to make the withstand voltage of a load high. However, in the present embodiment, because it is a step-down type, inexpensive components of low withstand voltage can be used.

Figure 10:
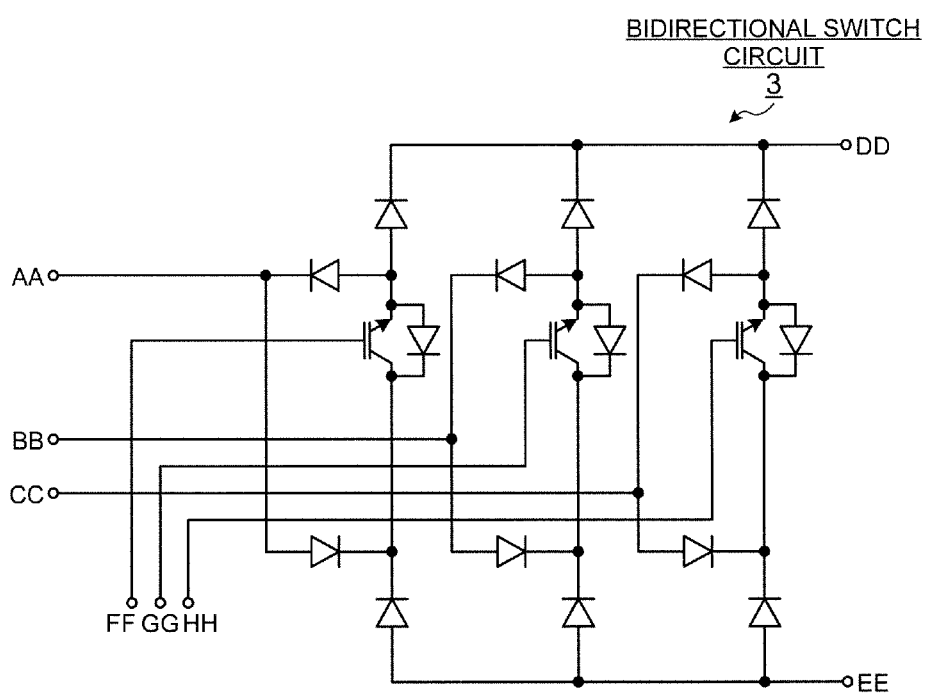
FIG. 10 is a schematic circuit diagram illustrating another configuration example of a bidirectional switch circuit.

The present invention is not limited to the above-described embodiment, and a circuit illustrated in FIG. 10 can function as the bidirectional switch circuit 3 by being connected to the corresponding points AA to HH indicated in FIG. 1. Further, while switching patterns are described as being generated using saw-tooth waves in the present embodiment, it is not so limited. It only needs to satisfy the restriction with respect to a maximum potential phase and a minimum potential phase and, for example, a carrier waveform such as a triangle wave may be used.

Second Embodiment

With reference to FIGS. 11A to 22, a three-phase rectifier according to a second embodiment will be described. By the three-phase rectifier of the first embodiment described above, even when a capacitor and a reactor of small capacity are used, it is possible to reduce pulsation of DC voltage and harmonics of input current. The applicant has studied an improvement of the first embodiment to reduce pulsation of DC voltage and harmonics of input current when a capacitor and a reactor of even smaller capacity are used.

Figure 11A:
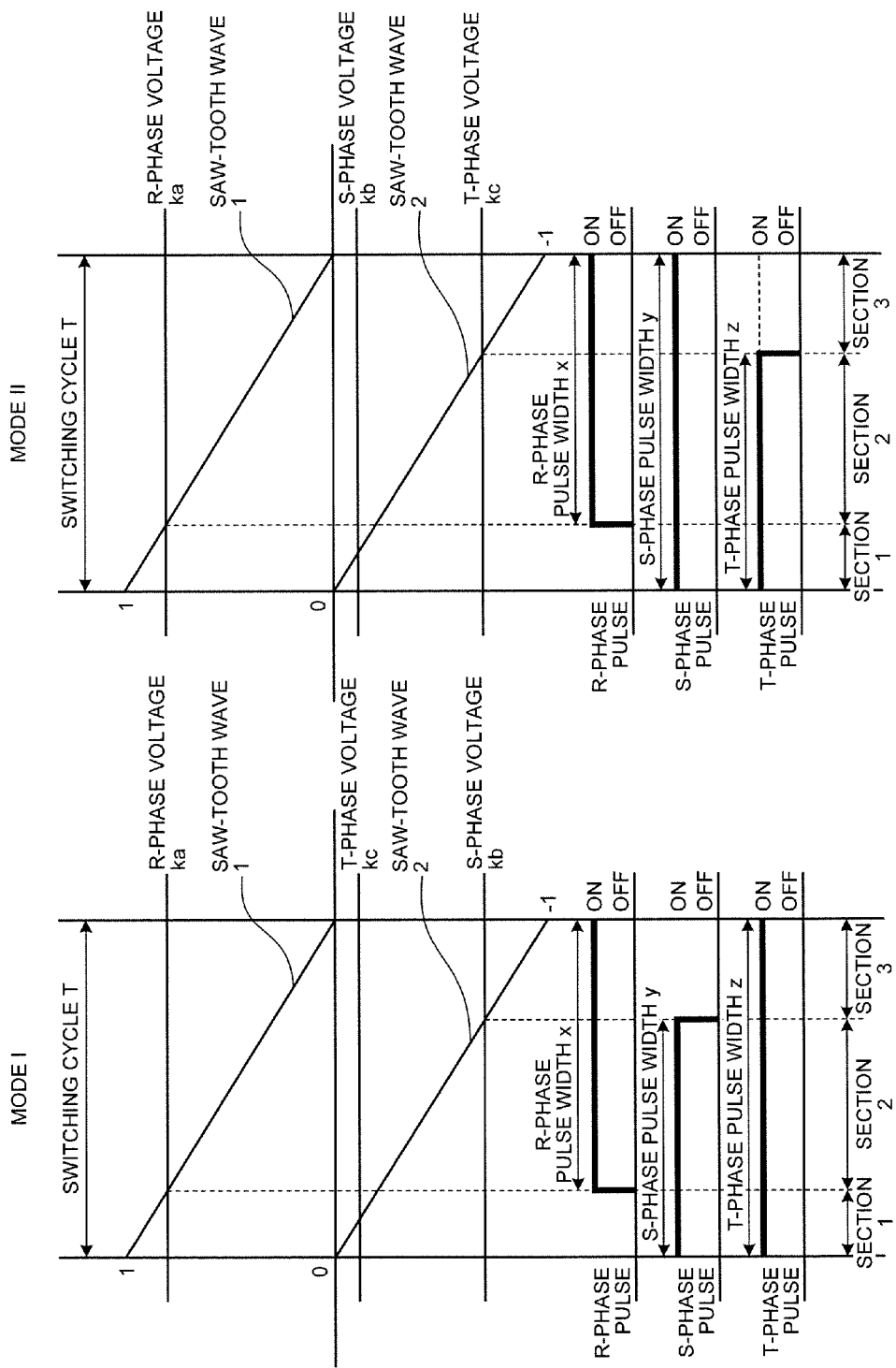
FIG. 11A is a pair of charts illustrating examples of R-, S-, and T-phase control voltages ka, kb, and kc, saw-tooth waves 1 and 2, and R-, S-, and T-phase pulses of a first embodiment in mode I and mode II.
Figure 11C:
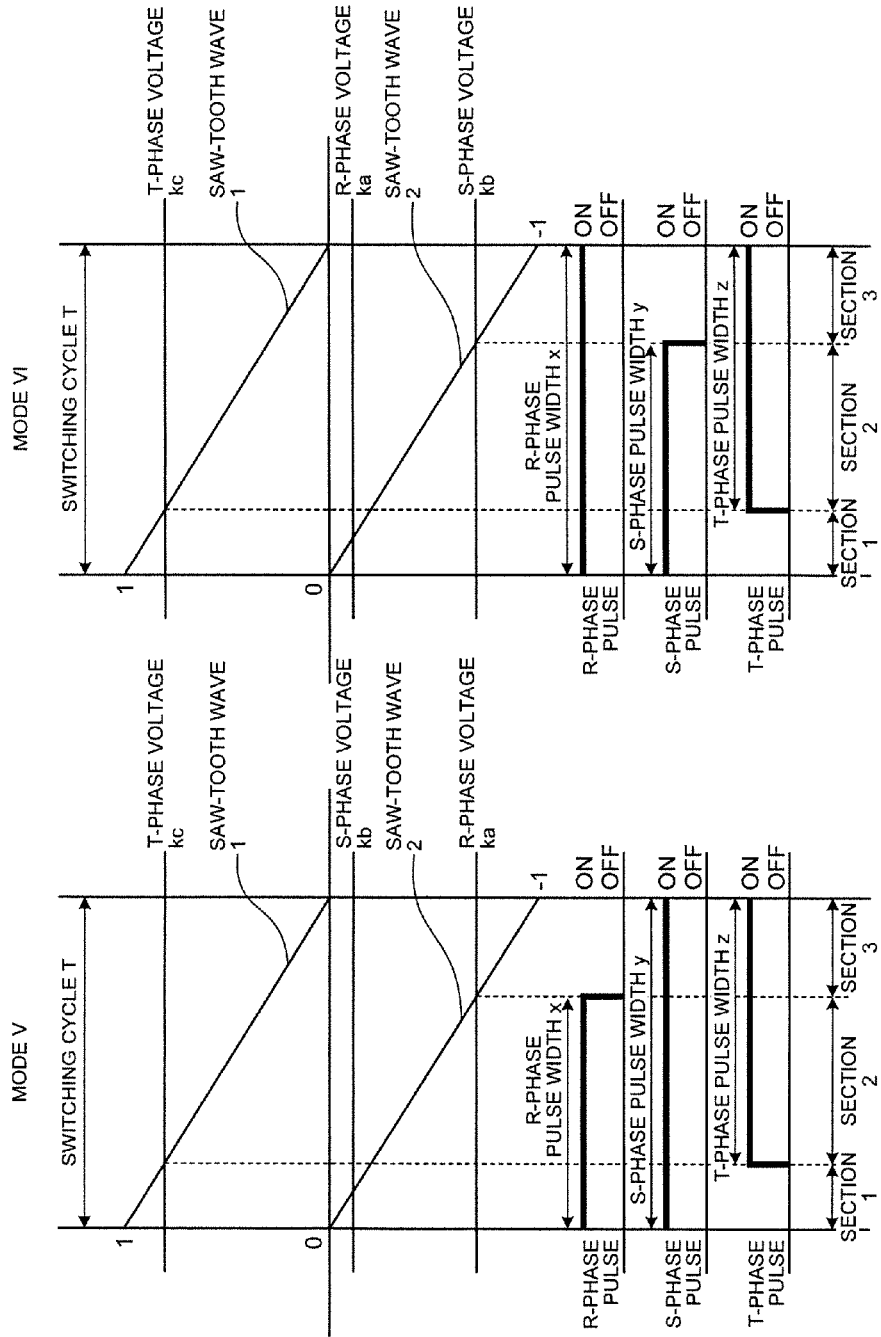
FIG. 11C is a pair of charts illustrating examples of R-, S-, and T-phase control voltages ka, kb, and kc, saw-tooth waves 1 and 2, and R-, S-, and T-phase pulses of the first embodiment in mode V and mode VI.

In the first embodiment above, by setting the gain k of the voltage setter 12 depicted in FIG. 3 to a value smaller than 1, both of the conductive time by an intermediate potential phase (hereinafter, referred to as an intermediate phase) and a maximum potential phase (hereinafter, referred to as a maximum phase) and the conductive time by an intermediate phase and a minimum potential phase (hereinafter, referred to as a minimum phase) are widened (narrowing down the conductive time by a maximum phase and a minimum phase) to step down the voltage. However, when the gain k is set to a small value, near a switching point between modes in FIG. 7, a spike waveform may appear in input current making harmonic current larger. In the followings, the reasons (1) and (2) thereof will be explained. FIGS. 11A to 11C are a group of charts illustrating examples of R-, S-, and T-phase control voltages ka, kb, and kc, saw-tooth waves 1 and 2, and R-, S-, and T-phase pulses of the first embodiment in the respective modes of mode I to mode VI.

Figure 19:
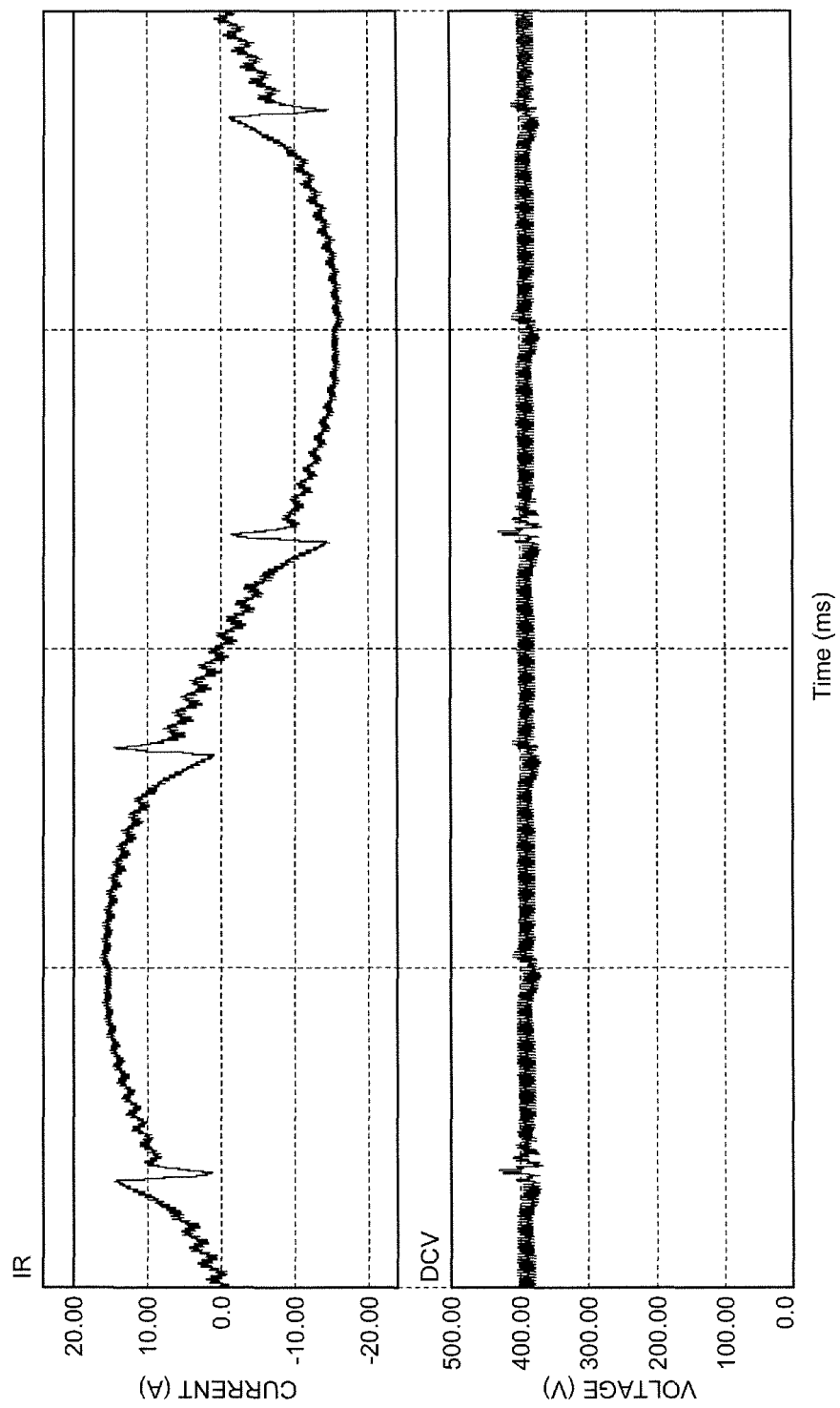
FIG. 19 is a chart illustrating simulation results with an input capacitor of 3 µF at a switching frequency of 20 kHz in the circuit configuration of the first embodiment.

(1) When the gain k is made small, a conductive width of an intermediate phase is widened, whereby the amount of inflow and outflow current of the intermediate phase becomes larger, which increases voltage fluctuation at the input capacitor of the intermediate phase. When the voltage fluctuation of an intermediate phase becomes larger and the inversion with respect to the voltages of a maximum phase and a minimum phase occurs, the intermediate phase is no longer at an intermediate potential, whereby the current no longer flows from the maximum phase to the intermediate phase or from the intermediate phase to the minimum phase. This phenomenon causes spike current waveforms near the switching point between an intermediate phase and a maximum phase or a minimum phase as illustrated in FIG. 19.

(2) As illustrated in FIGS. 11A to 11C, the order of R-, S-, and T-pulses of the section voltages in respective modes of mode I to mode VI is irregular. For example, a section 1 voltage in mode II is an S–T line voltage, while that in mode III is an R–T line voltage. When the order of pulses is irregular, charging and discharging of the input capacitor become unbalanced, which causes spike current waveforms, as illustrated in FIG. 19, to occur.

In FIG. 3 of the first embodiment, (1) setting the gain k of the voltage setter 12 high, (2) setting the carrier frequency (switching frequency) high, and (3) making the input capacitor large make it possible to solve this matter. However, (1) setting the gain k high restricts a step-down range of the DC voltage, (2) making the capacitor large increases cost, and (3) setting the frequency high increases switching losses.

In the second embodiment, the issues of the first embodiment are solved by the following guidelines.

(1) The bidirectional switch circuit is switched off for at least two phases out of all phases (R-phase, S-phase, and T-phase) to provide a switching section where no current flows through all phases to step down the voltage (lower the voltage without widening the conductive width of an intermediate phase).

(2) The order of pulses of section voltages in all modes of mode I to mode VI is regularly arranged (the same phase has a switching pattern of the same regularity in all modes) to make the input capacitor charged and discharged regularly.

By the above-described guideline (1), the DC voltage can be lowered without widening the conductive width of an intermediate phase. Thus, it is possible to avoid an increase of voltage fluctuation at the input capacitor of the intermediate phase. By the above-described guideline (2), the order of pulses of section voltages is regularly arranged in respective modes I to VI, whereby the charging and discharging of the input capacitor of the respective phases can be balanced. As a consequence, without raising the switching frequency, spike current waveforms at the time of charging and discharging the input capacitor can be avoided. Furthermore, because the voltage fluctuation at the input capacitor of an intermediate phase is not increased, an input capacitor of small capacity can be used.

The overall configuration of a power convertor that employs a step-down three-phase rectifier according to the second embodiment is the same as illustrated in FIG. 1.

[Configuration Example of Switching Pattern Generator]

Figure 12:
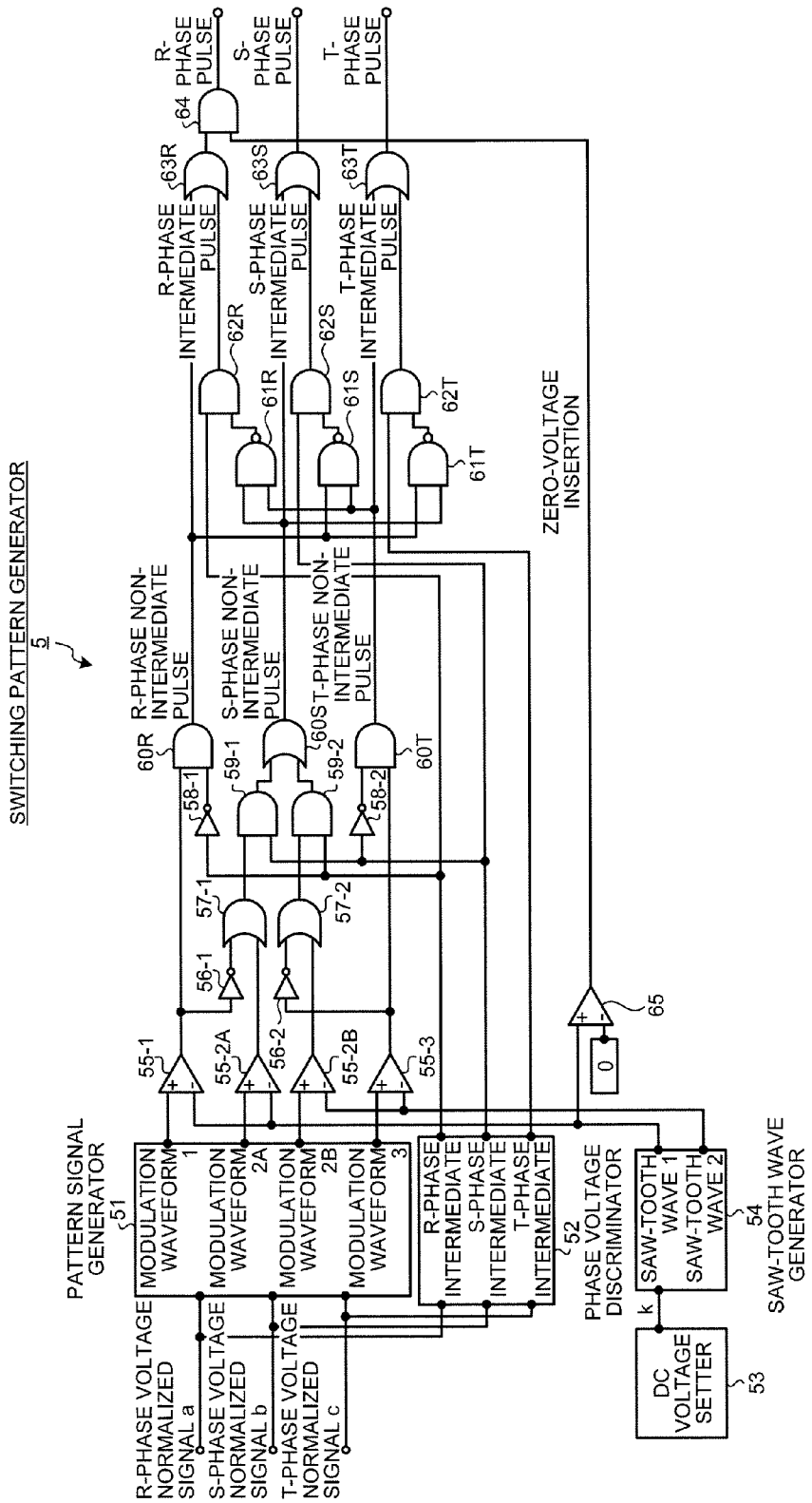
FIG. 12 is a circuit block diagram illustrating an example of a switching pattern generator according to a second embodiment of the present invention.
Figure 13:
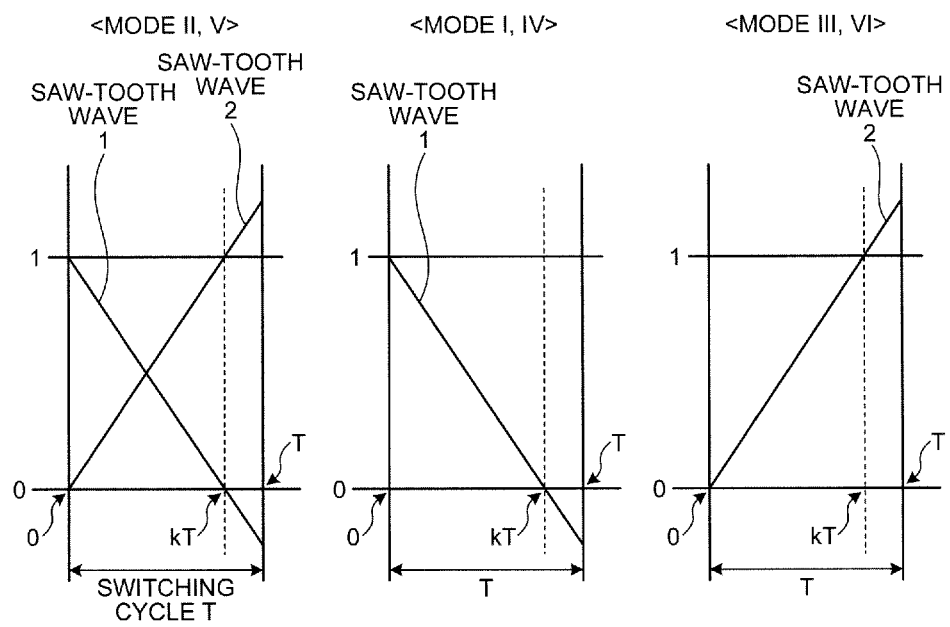
FIG. 13 is a group of charts illustrating example waveforms of saw-tooth waves 1 and 2 generated in a saw-tooth wave generator.
Figure 14:
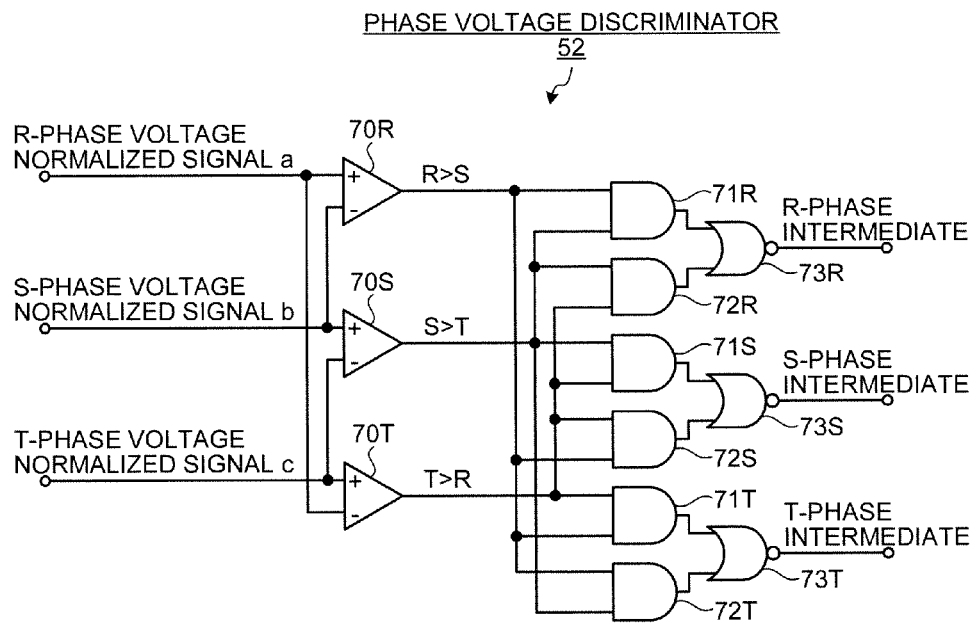
FIG. 14 is a schematic circuit diagram illustrating a configuration example of a phase voltage discriminator.
Figure 15:
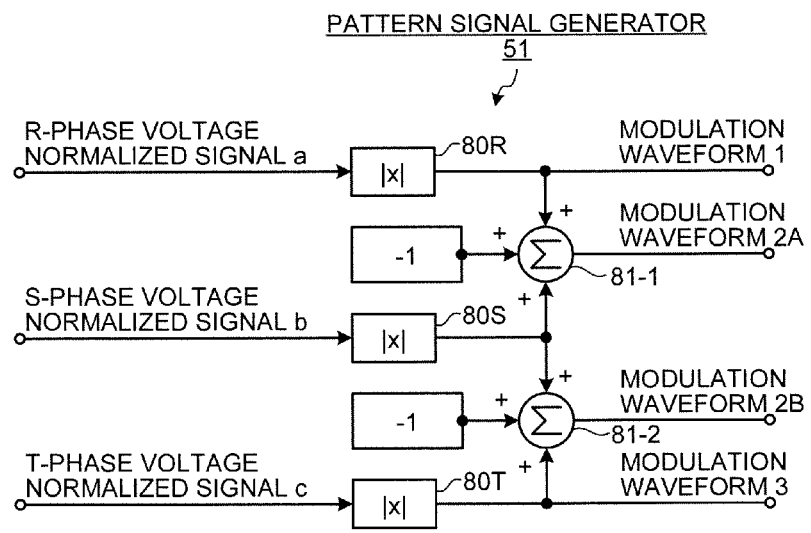
FIG. 15 is a schematic circuit diagram illustrating a configuration example of a pattern signal generator.

FIG. 12 is a circuit block diagram illustrating an example of the switching pattern generator 5 in FIG. 1. FIG. 13 is a group of charts illustrating example waveforms of saw-tooth waves 1 and 2 used when generating switching patterns in the switching pattern generator 5. FIG. 14 is a schematic circuit diagram illustrating a configuration example of a phase voltage discriminator 52 of the switching pattern generator 5. FIG. 15 is a schematic circuit diagram illustrating a configuration example of a pattern signal generator 51 of the switching pattern generator 5.

Figure 16:
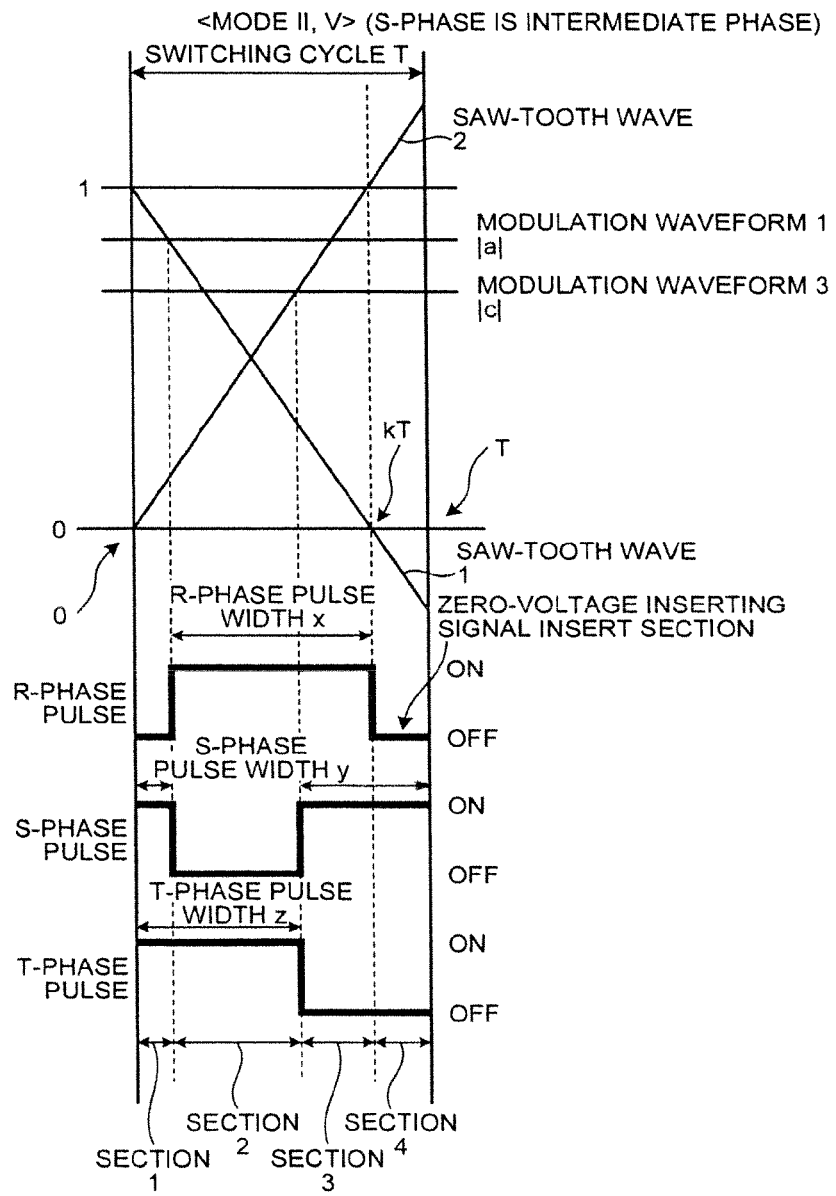
FIG. 16 is a chart illustrating examples of modulation waveforms, saw-tooth waves, and R-, S-, and T-phase pulses in mode II and mode V.
Figure 17:
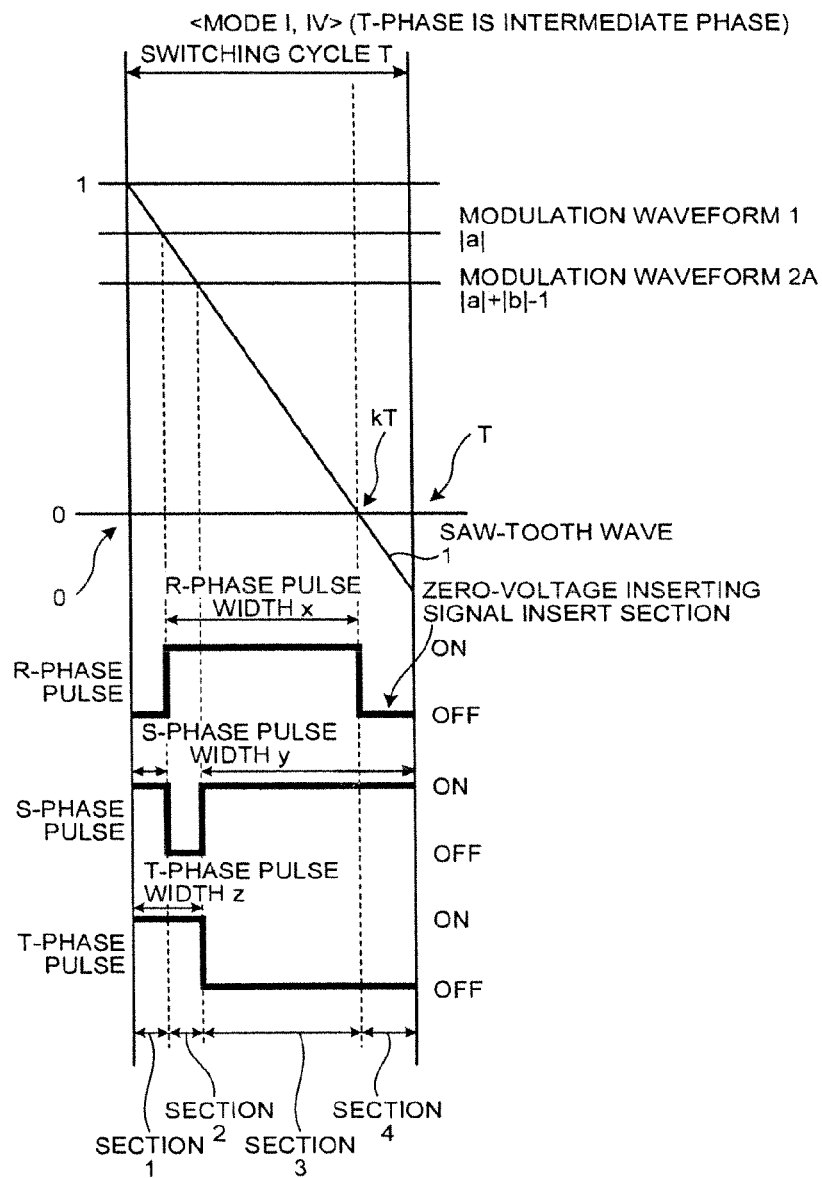
FIG. 17 is a chart illustrating examples of modulation waveforms, a saw-tooth wave, and R-, S-, and T-phase pulses in mode I and mode IV.
Figure 18:
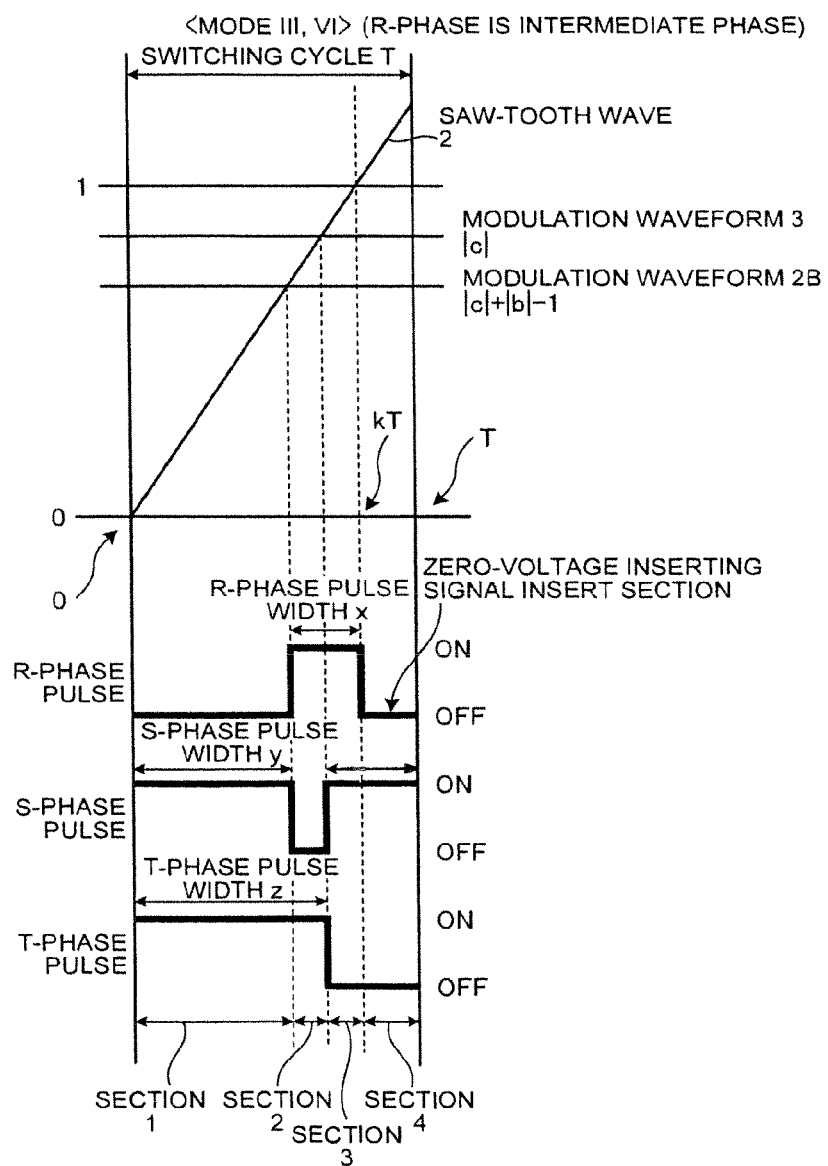
FIG. 18 is a chart illustrating examples of modulation waveforms, a saw-tooth wave, and R-, S-, and T-phase pulses in mode III and mode VI.

The switching pattern generator 5 of the present embodiment generates switching patterns (R-, S-, and T-phase pulses) as illustrated in FIGS. 16 to 18 based on the above-described guidelines. The switching pattern generator 5 detects which phase of the three-phase AC power supply 1 is an intermediate phase at a predetermined timing such as a rising edge of switching cycles, and obtains on and off timings of switching patterns from modulation waveforms generated in response to the detection result and the saw-tooth waves to generate the switching patterns. The switching pattern generator 5 includes, as illustrated in FIG. 12, the pattern signal generator 51, the phase voltage discriminator 52, a DC voltage setter 53, a saw-tooth wave generator 54, comparators 55-1 to 55-3, NOT circuits 56-1 and 56-2, OR circuits 57-1 and 57-2, NOT circuits 58-1 and 58-2, AND circuits 59-1 and 59-2, AND circuits 60R and 60T, an OR circuit 60S, NAND circuits 61R to 61T, AND circuits 62R to 62T, OR circuits 63R to 63T, and an AND circuit 64.

In order to regularly arrange the order of pulses of section voltages in all modes of mode I to mode VI, the pattern signal generator 51 carries out a calculation with an R-phase voltage normalized signal a, an S-phase voltage normalized signal b, and a T-phase voltage normalized signal c in which the respective peak values of input phase voltages are normalized to 1, and outputs a modulation waveform 1, a modulation waveform 2A, a modulation waveform 2B, and a modulation waveform 3.

The DC voltage setter 53 sets a DC voltage setting gain k (where k≤1) to the saw-tooth wave generator 54. The saw-tooth wave generator 54 outputs a saw-tooth wave 1 and a saw-tooth wave 2. The phase voltage discriminator 52 compares the potentials of an R-phase voltage normalized signal a, an S-phase voltage normalized signal b, and a T-phase voltage normalized signal c input, and discriminates R-phase intermediate, S-phase intermediate, and T-phase intermediate to output respective intermediate determining signals (1 when intermediate, and 0 when not intermediate). More specifically, for S-phase intermediate, modulation waveforms 1 and 3 are output and saw-tooth waves 1 and 2 are output (see FIG. 16). For T-phase intermediate, modulation waveforms 1 and 2A are output and a saw-tooth wave 1 is output (see FIG. 17). For R-phase intermediate, modulation waveforms 3 and 2B are output and a saw-tooth wave 2 is output (see FIG. 18). Accordingly, the switching pattern generator 5 changes generating method of switching patterns depending on which phase is an intermediate phase. Consequently, the switching patterns of the same phase can maintain the same regularity in all modes.

The AND circuit 60R performs an AND operation of a comparison signal in which a modulation waveform 1 and a saw-tooth wave 1 are compared by the comparator 55-1 and an output of the NOT circuit 58-1 in which a NOT operation is performed to an R-phase intermediate signal, and outputs the result as an R-phase non-intermediate pulse.

The AND circuit 60T performs an AND operation of a comparison signal in which a modulation waveform 2B and a saw-tooth wave 2 are compared by the comparator 55-3 and an output of the NOT circuit 58-2 in which a NOT operation is performed to a T-phase intermediate signal, and outputs the result as a T-phase non-intermediate pulse.

The OR circuit 57-1 performs an OR operation of a comparison signal in which a modulation waveform 2A and a saw-tooth wave 1 are compared by the comparator 55-2A an output of the NOT circuit 56-1 in which a NOT operation is performed to the comparison signal of the comparator 55-1. The OR circuit 57-2 performs an OR operation of a comparison signal in which a modulation waveform 2B and a saw-tooth wave 2 are compared by the comparator 55-2B and an output of the NOT circuit 56-2 in which a NOT operation is performed to the comparison output of the comparator 55-3.

The OR circuit 60S performs an OR operation of an output of the AND operation, in the AND circuit 59-1, of the OR operation output of the OR circuit 57-1 and a T-phase intermediate signal and an output of the AND operation, in the AND circuit 59-2, of the OR operation output of the OR circuit 57-2 and an R-phase intermediate signal, and outputs an S-phase non-intermediate pulse.

The AND circuit 62R performs an AND operation of an output of the NAND operation, in the NAND circuit 61R, of an S-phase non-intermediate pulse and a T-phase non-intermediate pulse and an R-phase intermediate signal, and outputs an R-phase intermediate pulse.

The AND circuit 62S performs an AND operation of an output of the NAND operation, in the NAND circuit 61S, of an R-phase non-intermediate pulse and a T-phase non-intermediate pulse and an S-phase intermediate signal, and outputs the result as an S-phase intermediate pulse.

The AND circuit 62T performs an AND operation of an output of the NAND operation, in the NAND circuit 61T, of an R-phase non-intermediate pulse and an S-phase non-intermediate pulse and a T-phase intermediate signal, and outputs the result as a T-phase intermediate pulse.

The comparator 65 compares a saw-tooth wave 1 with 0 input, and outputs a comparison signal as a zero-voltage inserting signal.

The AND circuit 64 performs an AND operation of an output of the OR operation, in the OR circuit 63R, of an R-phase non-intermediate pulse and an R-phase intermediate pulse and a zero-voltage inserting signal, and outputs the result as an R-phase pulse. This introduces a switching pattern (section 4) that switches off the bidirectional switch to the R-phase pulse.

The OR circuit 63T performs an OR operation to a T-phase non-intermediate pulse and a T-phase intermediate pulse, and outputs the result as a T-phase pulse. In such T-phase pulse, because the output of the OR circuit 63T is 0 during the zero-voltage inserting signal, the operation with the zero-voltage inserting signal is not performed.

The OR circuit 63T performs an OR operation of an S-phase non-intermediate pulse and an S-phase intermediate pulse, and outputs an S-phase pulse. The R-phase pulse and the T-phase pulse come to 0 during the zero-voltage inserting signal, and thus no DC voltage occurs even when the S-phase pulse is on. For the purpose of not increasing the number of T-phase switching times, the operation with the zero-voltage inserting signal is not performed.

The saw-tooth wave generator 54 outputs, based on a DC voltage setting gain k of the DC voltage setter 53, a saw-tooth wave 1 with a straight line connecting the points (time axis kT, gain axis 0) and (time axis 0, gain axis 1) where a cycle is defined as T, as illustrated in FIG. 13. The saw-tooth wave generator 54 further outputs, based on the DC voltage setting gain k, a saw-tooth wave 2 with a straight line connecting the points (time axis 0, gain axis 0) and (time axis kT, gain axis 1).

The phase voltage discriminator 52 includes, as illustrated in FIG. 14, comparators 70R, 70S, and 70T, AND circuits 71R, 71S, and 71T, AND circuits 72R, 72S, and 72T, and NOR circuits 73R, 73S, and 73T.

The comparator 70R compares an R-phase voltage normalized signal a with an S-phase voltage normalized signal b, and outputs a comparison signal (1 when the R-phase voltage normalized signal a>the S-phase voltage normalized signal b, and 0 when the R-phase voltage normalized signal a≤the S-phase voltage normalized signal b) to the AND circuits 71R, 72S, 71T, and 72T. The comparator 70S compares an S-phase voltage normalized signal b with a T-phase voltage normalized signal c, and outputs a comparison signal (1 when the S-phase voltage normalized signal b>the T-phase voltage normalized signal c, and 0 when the S-phase voltage normalized signal b≤the T-phase voltage normalized signal c) to the AND circuits 71R, 72R, 71S, and 72T. The comparator 70T compares a T-phase voltage normalized signal c with an R-phase voltage normalized signal a, and outputs a comparison signal (1 when the T-phase voltage normalized signal c>the R-phase voltage normalized signal a, and 0 when the T-phase voltage normalized signal c≤the R-phase voltage normalized signal a) to the AND circuits 72R, 71S, 72S, and 71T.

The AND circuit 71R outputs the result of the AND operation of the comparison signal of the comparator 70R and the comparison signal of the comparator 70S. The AND circuit 72R outputs the result of the AND operation of the comparison signal of the comparator 70S and the comparison signal of the comparator 70T. The AND circuit 71S outputs the result of the AND operation of the comparison signal of the comparator 70S and the comparison signal of the comparator 70T. The AND circuit 72S outputs the result of the AND operation of the comparison signal of the comparator 70T and the comparison signal of the comparator 70R. The AND circuit 71T outputs the result of the AND operation of the comparison signal of the comparator 70T and the comparison signal of the comparator 70R. The AND circuit 72T outputs an AND operation result of the comparison signal of the comparator 70R and the comparison signal of the comparator 70S.

The NOR circuit 73R outputs the result of the NOR operation of the output of the AND circuit 71R and the output of the AND circuit 72R (1 when intermediate, and 0 when not intermediate) as an R-phase intermediate signal. The NOR circuit 73S outputs the result of the NOR operation of the output of the AND circuit 71S and the output of the AND circuit 72S (1 when intermediate, and 0 when not intermediate) as an S-phase intermediate signal. The NOR circuit 73T outputs the result of the NOR operation of the output of the AND circuit 71T and the output of the AND circuit 72T (1 when intermediate, and 0 when not intermediate) as a T-phase intermediate signal.

The pattern signal generator 51 that forms respective modulation waveforms includes, as illustrated in FIG. 15, absolute value circuits 80R, 80S, and 80T, and three-input adders 81-1 and 81-2. The absolute value circuit 80R calculates an absolute value |a| of an R-phase voltage normalized signal a, and outputs a modulation waveform 1. The absolute value circuit 80S calculates and outputs an absolute value |b| of an S-phase voltage normalized signal b. The absolute value circuit 80T calculates an absolute value |c| of a T-phase voltage normalized signal c, and outputs a modulation waveform 3.

The three-input adder 81-1 performs an addition of a modulation waveform 1, the output of the absolute value circuit 80S, and a constant value of −1, and outputs a modulation waveform 2A. The three-input adder 81-2 performs an addition of a modulation waveform 3, the output of the absolute value circuit 80S, and a constant value of −1, and outputs a modulation waveform 2B.

[DC Voltage and Each Phase Current by Switching Operations in Mode I to Mode VI]

With reference to FIGS. 16 to 18, DC voltages and current of respective phases by switching operations in mode I to mode VI indicated in FIG. 7 will be explained. In the followings, the modes I, II, and III will be explained because the T-phase becomes an intermediate phase in both mode I and mode IV, the S-phase becomes an intermediate phase in both mode II and mode V, and the R-phase becomes an intermediate phase in both mode III and mode VI. FIG. 16 is a chart illustrating examples of modulation waveforms, saw-tooth waves, and R-, S-, and T-phase pulses in modes II and V. FIG. 17 is a chart illustrating examples of modulation waveforms, a saw-tooth wave, and R-, S-, and T-phase pulses in modes I and IV. FIG. 18 is a chart illustrating examples of modulation waveforms, a saw-tooth wave, and R-, S-, and T-phase pulses in modes III and VI.

As illustrated in FIGS. 16 to 18, an R-phase pulse goes off→on→off, an S-phase pulse goes on→off→on, and a T-phase pulse goes on→off in all modes of mode I to mode VI, and the same phase has a pattern with the same regularity in which the change between on and off is regulated in all modes of mode I to mode VI. Furthermore, in all modes of mode I to mode VI, the R-phase pulse is provided with a period (section 4) where a zero-voltage inserting signal is to be inserted, and in the period where the zero-voltage inserting signal is inserted, a switching pattern for switching off the bidirectional switch circuit is inserted in the R-phase pulse. Therefore, in the section 4, two phases (R-phase and T-phase) out of three phases are switched off, whereby no current flows through any phases.

(1) Mode II

The DC voltages will be explained, first. In FIG. 16, the DC voltages at sections 1, 2, 3, and 4 are of an S–T line voltage=b–c, an R–T line voltage=a–c, an R–S line voltage=a–b, and a rectifier output short-circuiting voltage=0, respectively. The respective phase pulses will be explained. In mode II, the R-phase is a maximum phase, the T-phase is a minimum phase, and the S-phase is an intermediate phase. Similar to the first embodiment (FIG. 8), at a maximum phase and a minimum phase, the pulses become on for a time proportional to the respective potentials. Accordingly, the pulse width x of the R-phase is x=kT|a|, and the pulse width z of the T-phase is z=kT|c|. The timing of the R-phase pulse becoming on (section 1) is obtained from the intersection point of an R-phase voltage |a| and a saw-tooth wave 1. The timing of the R-phase pulse becoming off (section 1+section 2+section 3) is obtained from the intersection point of the saw-tooth wave 1 and the gain axis 0. Accordingly, the R-phase pulse is obtained. Meanwhile, the timing of a T-phase pulse becoming off (section 1+section 2) is obtained from the intersection point of a T-phase voltage |c| and a saw-tooth wave 2. Accordingly, the T-phase pulse is obtained. An intermediate phase pulse becomes on when the pulse of either of a maximum phase or a minimum phase is off. Therefore, the S-phase pulse is obtained from the intersection point of the R-phase voltage |a| and the saw-tooth wave 1 and the intersection point of the T-phase voltage |c| and the saw-tooth wave 2. The widths of the sections 1, 2, 3, and 4 become kT×(1−|a|), kT×(|a|+|c|−1), kT×(1−|c|), and T×(1−k), respectively. By multiplying DC voltages for the respective sections, adding the respective results, and dividing the sum by the switching cycle T, the average of DC voltages in the switching cycle T can be expressed as follows:

average of DC voltages in the switching cycle $T=\{(b-c)\times kT\times(1-a)+(a-c)\times kT\times(a-c-1)+(a-b)\times kT\times(1+c)+0\times T\times(1-k)\}/T=k\{a^2+c^2-b(a+c)\}$ with the consideration of a+b+c=0 (three-phase condition), $=k(a^2+b^2+c^2)$ further, from $a^2+b^2+c^2=3/2$ in AC theory, $=k\times 3/2$ Consequently, it is a constant voltage proportional to k.

Next, the input currents will be explained. As an R-phase input current, a positive current flows proportional to the time of an R-phase voltage a. As a T-phase input current, a negative current flows proportional to the magnitude of a T-phase voltage |c|. As an S-phase input current, a positive current flows at the section 1, and a negative current flows at the section 3. Accordingly, the flowing current is represented by kT×(1−a)−kT×(1+c)=kT(−a−c)=kTb, and dividing it by kT that is the period of the switching cycle T excluding the section 4 to which a zero-voltage inserting signal is inserted results in an S-phase voltage b. Consequently, in the R-, S-, and T-phases, the current flows proportional to an R-phase voltage a, an S-phase voltage b, and a T-phase voltage c, respectively, and thus is of a sine wave.

(2) Mode I

In FIG. 17, the DC voltages at the sections 1, 2, 3, and 4 are of an S–T line voltage=c–b, an R–T line voltage=a–c, an R–S line voltage=a–b, and a rectifier output short-circuiting voltage=0, respectively. The pulses of the respective phases will be explained. In mode I, the R-phase is a maximum phase, the S-phase is a minimum phase, and the T-phase is an intermediate phase. Because the pulses are on for a time proportional to the respective potentials at the maximum phase and the minimum phase without changing the order of on and off of R-, S-, and T-phase pulses, in mode I, modulation waveforms 1 and 2A and a saw-tooth wave 1 are used to obtain the on and off timings of the respective pulses illustrated in FIG. 17. The widths of the sections 1, 2, 3, and 4 are kT×(1−|a|), kT×(1−|b|), kT×(|a|−|b|−1), and T×(1−k), respectively. The average of DC voltages in the switching cycle T can be expressed as follows.

Average of DC voltages in the switching cycle $T=\{(c-b)\times kT\times(1-a)+(a-c)\times kT\times(b+1)+(a-b)\times kT\times(a-b-1)+0\times kT\times(1-k)\}/T=k\{(a^2+c^2-c(a+b)\}$ with the consideration of a+b+c=0 (three-phase condition), $=k(a^2+b^2+c^2)$ further, from $a^2+b^2+c^2=3/2$ in AC theory, $=k\times 3/2$ Consequently, it is a constant voltage proportional to k.

The input currents will be explained. Similarly to that in mode II, in the R-phase of a maximum phase, a positive current flows proportional to the time of an R-phase voltage a. In the S-phase of a minimum phase, a negative current flows proportional to the time of an S-phase voltage b. In the T-phase, a negative current flows at the section 1, and a positive current flows at the section 2. Therefore, the flowing current is represented by kT×(1−a)−kT×(1+b)=kTc, and dividing it by kT results in c. Consequently, the current proportional to voltage flows in each phase, and thus is of a sine wave.

(3) Mode III

In FIG. 18, DC voltages at the sections 1, 2, 3, and 4 are of an S–T line voltage=b–c, an R–T line voltage=a–c, an R–S line voltage=b–a, and a rectifier output short-circuiting voltage=0, respectively. The pulses of the respective phases will be explained. In mode III, the S-phase is a maximum phase, the T-phase is a minimum phase, and the R-phase is an intermediate phase. Similarly to mode I, because the pulses are on for a time proportional to the respective potentials at the maximum phase and the minimum phase without changing the order of on and off of R-, S-, and T-phase pulses, in mode III, modulation waveforms 3 and 2B and a saw-tooth wave 2 are used to obtain the on and off timings of the respective pulses illustrated in FIG. 18. The widths of the sections 1, 2, 3, and 4 are kT×(|b|+|c|−1), kT×(1−|b|), kT×(1−|c|), and T×(1−k), respectively. The average of DC voltages in the switching cycle T can be expressed as follows.

Average of DC voltages in the switching cycle $T=\{(b-c)\times kT\times(-c+b-1)+(a-c)\times kT\times(-b+1)+(b-a)\times kT\times(1+c)+0\times kT\times(1-k)\}/T=k\{b^2+c^2-a(b+c)\}$ with the consideration of a+b+c=0 (three-phase condition), $=k(a^2+b^2+c^2)$ further, from $a^2+b^2+c^2=3/2$ in AC theory, $$=k\times 3/2$$

Consequently, it is a constant voltage proportional to k.

The input currents will be explained. In mode III, because the S-phase is a maximum phase and the T-phase is a minimum phase, a positive current flows in the S-phase proportional to the time of an S-phase voltage b, and in the T-phase, a negative current flows proportional to the time of a T-phase voltage c. In the R-phase, a negative current flows at the section 2, and a positive current flows at the section 3. Therefore, the flowing current is represented by $kT\times(1-b)-kT\times(1+c)=kTa$, and dividing it by kT results in a. Consequently, the current proportional to voltage flows in each phase, and thus is of a sine wave.

As described in the foregoing, the DC voltage can be controlled to a voltage proportional to k in all modes, and the waveform of input currents can be made a sine wave.

[Simulation]

Figure 20:
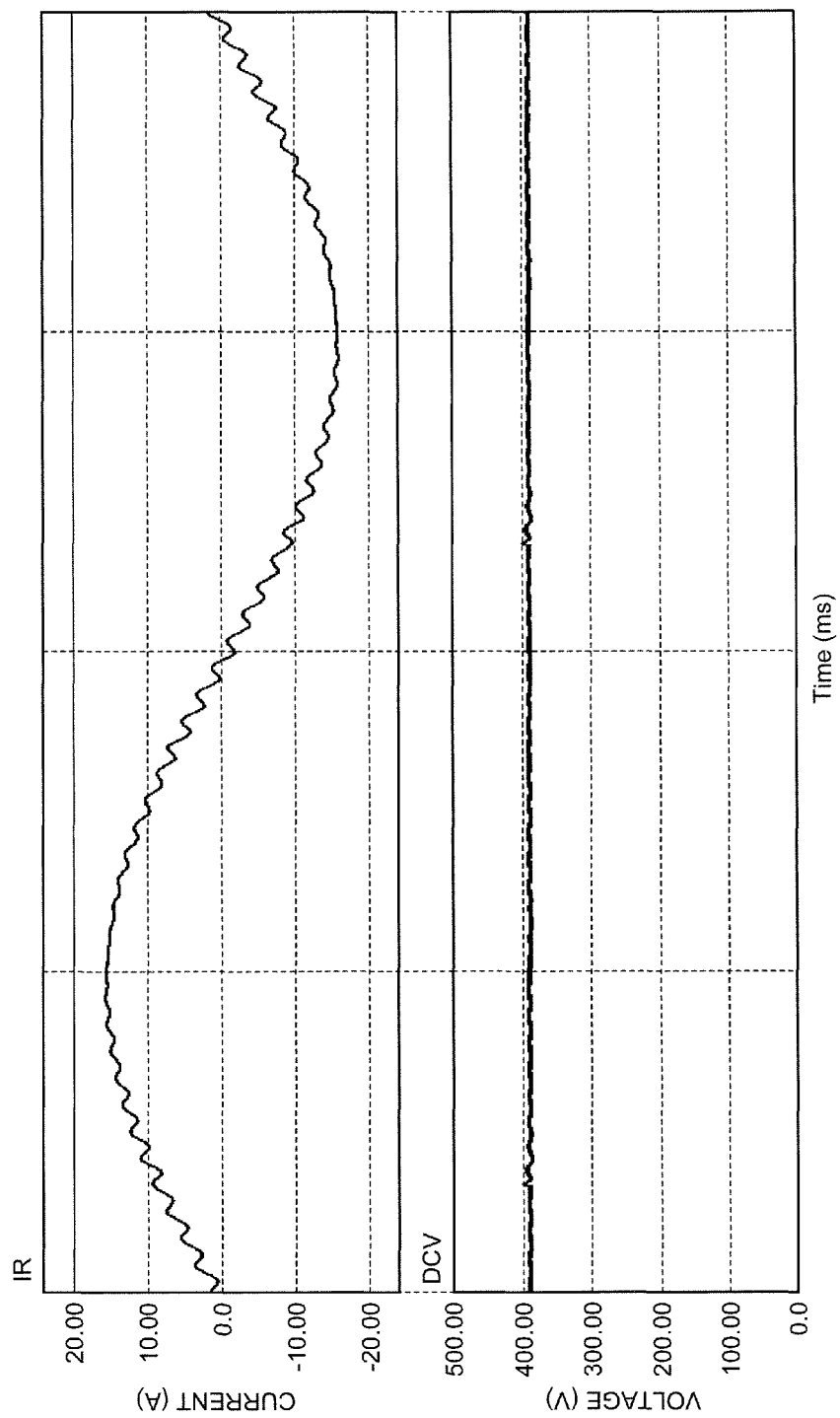
FIG. 20 is a chart illustrating simulation results with an input capacitor of 9 µF at a switching frequency of 50 kHz in the circuit configuration of the first embodiment.
Figure 21:
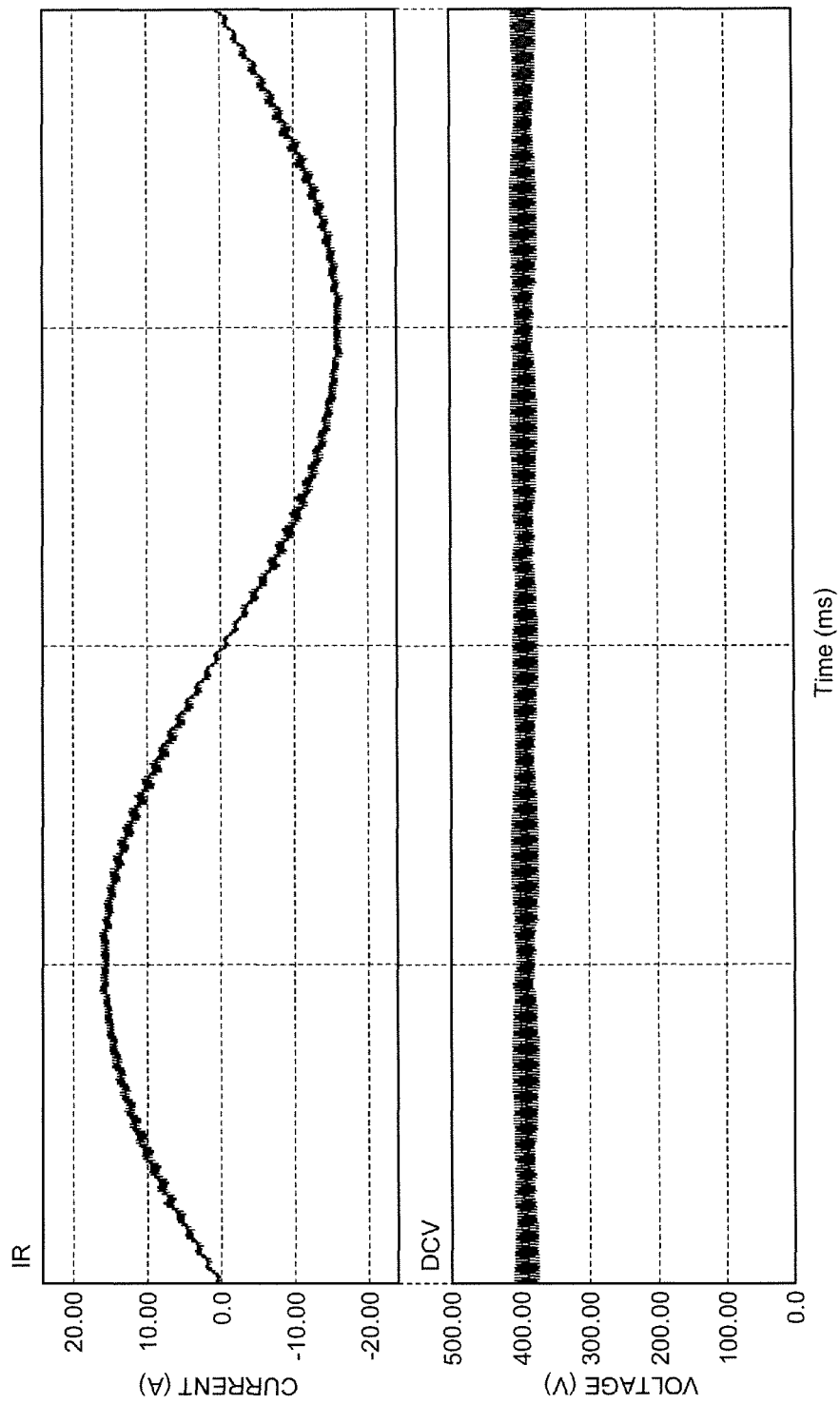
FIG. 21 is a chart illustrating simulation results with an input capacitor of 3 µF at a switching frequency of 20 kHz in the circuit configuration of the second embodiment.

With reference to FIGS. 19 to 21, the simulation results of DC voltage and DC current (R-phase current) according to the present embodiment will be explained. The simulation was carried out under the same condition as that of the first embodiment except for the capacitance of the input capacitor and the switching frequency.

FIG. 19 illustrates simulation results with an input capacitor of 3 μF at a switching frequency of 20 kHz in the circuit configuration of the first embodiment. As illustrated in FIG. 19, under the condition of the input capacitor of 3 μF and the switching frequency of 20 kHz, spike current waveforms are occurred and the fluctuation of the current is large.

FIG. 20 illustrates simulation results with an input capacitor of 9 μF at a switching frequency of 50 kHz in the circuit configuration of the first embodiment. As illustrated in FIG. 20, while making the capacitance of the input capacitor large and increasing the switching frequency high prevent spike current waveforms from occurring, the fluctuation of the current still remains large.

FIG. 21 illustrates simulation results with an input capacitor of 3 μF at a switching frequency of 20 kHz in the circuit configuration of the second embodiment. As illustrated in FIG. 21, even under the condition of the input capacitor of 3 μF and the switching frequency of 20 kHz, spike current waveforms are not occurred, and compared with the first embodiment, the fluctuation of the current is smaller. Thus, the effectiveness of the second embodiment is confirmed.

As described above, according to the second embodiment, because a section where no current flows in all phases of the switching patterns is introduced in each switching cycle to step down the voltage, the DC voltage can be lowered without widening the conductive width of an intermediate phase. This makes it possible to reduce the voltage fluctuation at the input capacitor of an intermediate phase. Accordingly, the voltage fluctuation at the input capacitor of an intermediate phase is not increased, which enables the use of an input capacitor of quite small capacitance.

Moreover, a section where the bidirectional circuit is switched off (zero-voltage inserting signal insert period) is provided in a switching pattern for one phase to introduce a section where no current flows in all phases. This allows the circuit configuration to be simplified.

Besides, according to the second embodiment, three-phase AC power is divided into a plurality of modes according to the magnitude relation of voltages of the respective phases, and switching patterns different for the respective phases are generated for each mode. The switching patterns have the same regularity for the same phase in all the modes. Thus, it is possible to balance the charging and discharging of the input capacitor of each phase. Consequently, without increasing the switching frequency, spike current waveforms can be prevented from occurring when the input capacitor is being charged and discharged.

Figure 22:
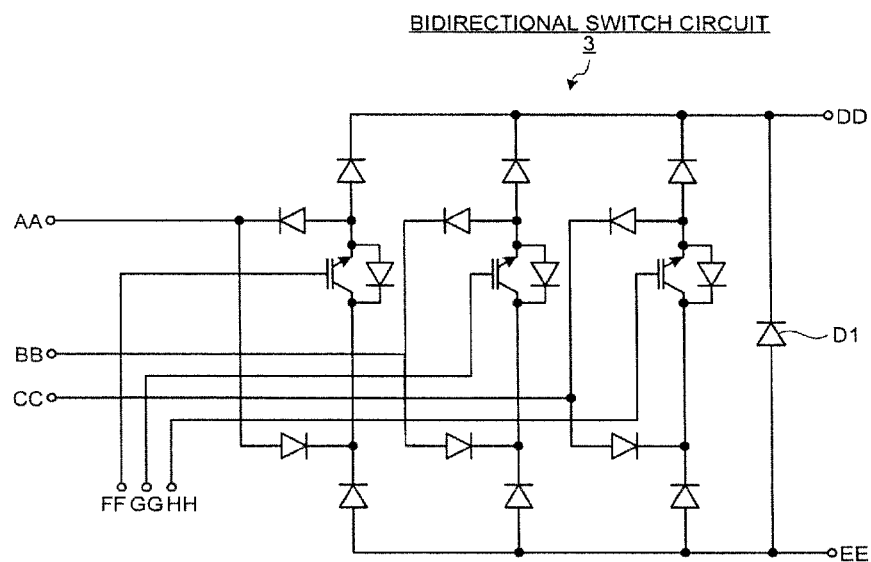
FIG. 22 is a schematic circuit diagram illustrating another configuration example of a bidirectional switch circuit.

The present invention is not limited to the second embodiment, and a circuit illustrated in FIG. 22 can function as the bidirectional switch circuit 3 by being connected to the corresponding points AA to HH indicated in FIG. 1. The circuit in FIG. 22 corresponds to a circuit in FIG. 10 to which a diode D1 is additionally connected on the output side thereof for a reflux current when inserting a zero-voltage. While switching patterns are described as being generated using saw-tooth waves in the present embodiment, it is not so limited. For example, a carrier waveform such as a triangle wave may be used.

INDUSTRIAL APPLICABILITY

As described above, the three-phase rectifier according to the present invention can be widely used in various apparatuses, and is particularly useful for air conditioners, refrigerators, washing machines, cleaners, and ventilators, and also motor drives or motor drive inverter controllers for these apparatuses.

The invention claimed is:

1. A three-phase rectifier that converts three-phase alternating current (AC) power supplied from a three-phase AC power supply into direct current (DC) power, the three-phase rectifier comprising:
    a full-wave rectifier circuit that rectifies the three-phase AC power to the DC power;
    a bidirectional switch circuit that switches on and off inputs of respective phases from the three-phase AC power supply to the full-wave rectifier circuit; and
    a controller that detects voltages of the respective phases of the three-phase AC power supply, generates switching patterns for the respective phases to switch the bidirectional switch circuit on and off based on the voltages of the phases, and controls switching of the bidirectional switch circuit based on the switching patterns, wherein
    the switching patterns for the respective phases have a predetermined switching cycle, and
    the controller detects a maximum potential phase, an intermediate potential phase, and a minimum potential phase in the voltages of the respective phases of the three-phase AC power supply, and generates, for the maximum potential phase and the minimum potential phase, switching patterns for switching on for a time proportional to respective potentials, at least one of which is on in the switching cycle, and generates, for the intermediate potential phase, a switching pattern for switching on constantly.

2. The three-phase rectifier according to claim 1, wherein a capacitor is connected between the three-phase AC power supply and the bidirectional switch circuit.

3. The three-phase rectifier according to claim 2, wherein a DC reactor is connected between the full-wave rectifier circuit and a load.

4. The three-phase rectifier according to claim 1, wherein a DC reactor is connected between the full-wave rectifier circuit and a load.

5. A three-phase rectifier that converts three-phase alternating current (AC) power supplied from a three-phase AC power supply into direct current (DC) power, the three-phase rectifier comprising:

a full-wave rectifier circuit that rectifies the three-phase AC power to the DC power;

a bidirectional switch circuit that switches on and off inputs of respective phases from the three-phase AC power supply to the full-wave rectifier circuit; and a controller that detects voltages of the respective phases of the three-phase AC power supply, generates switching patterns for the respective phases to switch the bidirectional switch circuit on and off based on the voltages of the phases, and controls switching of the bidirectional switch circuit based on the switching patterns, wherein the controller divides one cycle of the three-phase AC power into a plurality of modes according to magnitude relation of the voltages of the respective phases, the controller, in one mode of the plurality of modes, detects a maximum potential phase, an intermediate potential phase, and a minimum potential phase in the voltages of the respective phases of the three-phase AC power supply, and generates, for the maximum potential phase and the minimum potential phase, switching patterns for switching on for a time proportional to respective potentials, and generates, for the intermediate potential phase, a switching pattern for switching on when the pulse of either of the maximum potential phase or the minimum potential phase is on, and the switching patterns have the same regularity for the same phase in all the plurality of modes.

6. The three-phase rectifier according to claim 5, wherein the switching patterns for the respective phases have a predetermined switching cycle, and the controller introduces a period in which the bidirectional switch circuit is switched off for at least two phases in the switching cycle.

7. The three-phase rectifier according to claim 6, wherein the controller inserts zero voltage to a switching pattern for one phase.

* * * * *